US007675655B2

(12) United States Patent

Marshall et al.

(10) Patent No.: US 7,675,655 B2

(45) Date of Patent: Mar. 9, 2010

(54) MOVING OBJECT SCANNING APPARATUS AND METHOD

(75) Inventors: Gillian Fiona Marshall, Malvern (GB); Philip John Kent, Malvern (GB); Roger Appleby, Malvern (GB); David John Barrett, Malvern (GB); Janet Hughes, Malvern (GB); John Peter Gillham, Malvern (GB); Peter Russell Coward, Malvern (GB); Gordon Neil Sinclair, Malvern (GB); John Timothy Savage, Farnborough (GB); Piers Thomas Winchcombe Hawkesley, Farnborough (GB)

(73) Assignee: QinetiQ Limited (GB)

( * ) Notice: Subject to any disclaimer, the term of this patent is extended or adjusted under 35 U.S.C. 154(b) by 1180 days.

(21) Appl. No.: 10/547,652

(22) PCT Filed: Feb. 27, 2004

(86) PCT No.: PCT/GB2004/000820

§ 371 (c)(1), (2), (4) Date: Sep. 1, 2005

(87) PCT Pub. No.: WO2004/079659

PCT Pub. Date: Sep. 16, 2004

(65) Prior Publication Data

US 2006/0146377 A1 Jul. 6, 2006

(30) Foreign Application Priority Data

Mar. 7, 2003 (GB) ................................ 0305304.8

(51) Int. Cl.
*H04N 1/04* (2006.01)

(52) U.S. Cl. ....................... 358/486; 382/104; 382/103; 340/435; 342/22; 342/52; 348/140

(58) Field of Classification Search ................. 358/486; 382/104, 103; 340/435; 342/22, 52; 348/149
See application file for complete search history.

(56) References Cited

U.S. PATENT DOCUMENTS 5,748,231 A 5/1998 Park et al.

(Continued)

FOREIGN PATENT DOCUMENTS

| | | |
|---|---|---|
| GB | 2 222 500 | 3/1990 |
| WO | WO 03/003311 | 1/2003 |

OTHER PUBLICATIONS

Sinclair, G.N.; Coward, P.R.; Anderton, R.N.; Appleby, R.; Seys, T.; Southwood, P.; QinetiQ, Malvern, "Detection of Illegal Passengers in Lorries using a Passive Millimetre-Wave Scanner", Security Technology 2002. Proceedings. 36th Annual 2002 International Carnahan Conference, pp. 167-170 (in record).*

(Continued)

*Primary Examiner*—Mark K Zimmerman
*Assistant Examiner*—Jacky X Zheng
(74) *Attorney, Agent, or Firm*—McDonnell Boehnen Hulbert & Berghoff LLP

(57) ABSTRACT

Apparatus for scanning a moving object includes a visible waveband sensor 12 oriented to collect a series of images of the object as it passes through a field of view 16. An image processor 14 uses the series of images to form a composite image. The image processor 14 stores image pixel data for a current image and a predecessor image in the series. It uses information in the current image and its predecessor to analyse images and derive likelihood measures indicating probabilities that current image pixels correspond to parts of the object. The image processor 14 estimates motion between the current image and its predecessor from likelihood weighted pixels. It generates the composite image from frames positioned according to respective estimates of object image motion. Image motion may alternatively be detected by a speed sensor such as a Doppler radar 200 sensing object motion directly and providing image timing signals.

19 Claims, 12 Drawing Sheets

U.S. PATENT DOCUMENTS

| | | | | |
|---|---|---|---|---|
| 5,777,690 | A * | 7/1998 | Takeda et al. | 348/699 |
| 5,991,428 | A * | 11/1999 | Taniguchi | 382/107 |
| 6,259,359 | B1 * | 7/2001 | Fujinami et al. | 340/435 |
| 2001/0012982 | A1 * | 8/2001 | Ogura et al. | 701/301 |
| 2002/0168091 | A1 | 11/2002 | Trajkovic | |
| 2003/0007682 | A1 * | 1/2003 | Koshizen et al. | 382/157 |
| 2003/0219146 | A1 * | 11/2003 | Jepson et al. | 382/103 |

OTHER PUBLICATIONS

Rowley, H.A. Rehg, J.M. “Analyzing Articulated Motion using Expectation-Maximization”, Jun. 1997, Computer Vision and Pattern Recognition, 1997 Proceedings., 1997 IEEE Computer Society Conference, pp. 935-941 (in record).*
Sinclair et al., “Detection of Illegal Passengers in Lorris Using a Passive Millimetre Wave Scanner”, IEEE pp. 167-170 (2002).
Rowley et al., “Analyzing Articulated Motion Using Expectation-Maximization”, IEEE, pp. 935-941 (1997).
Vasconcelos, et al., “Frame-Free Video”, IEEE, pp. 375-378 (1996).
Matthews et al., “Simultaneous Motion Parameter Estimation and Image Segmentation Using the EM Algorithm”, pp. 542-545 (1995).
Nitsuwat et al., “Motion-Based Video Segmentation Using Fuzzy Clustering and Classical Mixture Model”, IEEE, pp. 300-303 (2000).

* cited by examiner

MOVING OBJECT SCANNING APPARATUS AND METHOD

This invention relates to scanning apparatus and to a method of scanning, and, in particular, to apparatus that is intended to image an object as a series of images taken when there is relative movement between the object and the scanning apparatus.

Imaging devices are known which implement scanning of an object by relying on relative motion between the object and a sensor. If an object moves across a field of view of a sensor, then an image of the object may be collected as a sequence of images or frames of sections of the object. This gives rise to a frame sequence extending in the object's direction of motion. Such imaging devices often make use of a relatively narrow detector to collect each frame image, successive frames being displaced in a direction parallel to the narrow detector dimension, and the scan is referred to as a push-broom scan. This arrangement is commonly employed if the sensor is required to be close to an object to be scanned, or to use a high magnification, in order to provide adequate resolution. However, it may be impractical or even impossible to provide detector with a sufficiently wide field of view to enable the object to be imaged in its entirety in a single frame. Examples include airport X-ray systems for inspection of hand baggage and satellite ground-scanning imagers.

WO 03/003311 discloses a target tracking system for monitoring a moving target. JP7284016 discloses determination of an adaptive motion vector for a digital image stabilisation system. GB 2,222,500 discloses television picture motion assessment by correlating regions of two pictures to produce motion vectors.

Problems are encountered in imaging systems which cannot image entire objects in a single frame. A first such problem is that a composite image of an object must be assembled from individual frames taken by an imaging system as the object moves past a sensor. Positioning of each frame in the composite image is critically dependent on scan speed. If the actual scan speed is not sufficiently closely matched to that which is assumed in image reconstruction, the composite image will appear distorted and its features may be difficult to identify. This may not be a problem for scanners used to monitor objects moving at a constant speed, e.g. items on a conveyor all moving at the same slow speed. However, it can be a significant problem if speed is controlled independently of a scanning system. This may be the case if the conveyor is replaced by more randomly moving rollers or for moving vehicle scans in which a vehicle driver, not a scanning equipment operator, controls scan speed.

A second problem for imagers of this kind is that the purpose of scanning is often to identify contents of containers which are opaque at convenient radiation wavelengths. Although containers will normally be transparent to X-rays, X-rays may not always be suitable not only because they are potentially harmful and so present significant health and safety issues, but also because they may damage container contents. For example, if there were to be a requirement to check that a box is correctly packaged with sensitive electronic equipment, X-ray inspection may confirm packaging, but damage the equipment. Moreover, no single scanning wavelength is ideal, and so surveillance and inspection systems have tended to use a combination of techniques, e.g. visible band imaging, X-ray imaging, carbon dioxide detection, millimeter wave imaging and thermal imaging. These techniques all have various advantages and disadvantages.

A visible waveband imager can provide a high-resolution image of the outside of a moving container, but its contents are not visible unless it is transparent, which is unlikely. Such imaging cannot be used at night unless additional (active) illumination is used and, if used outdoors in daylight, it is susceptible to dazzle if the sun's radiation enters the imager optics. A fixed-position camera requires very careful positioning in order to avoid dazzle throughout the day, because of the sun's movement across the sky.

X-ray imaging can provide a reasonable resolution image of the contents of many container-types, unless they are lined with an X-ray absorbing material. Cumulative exposure is dangerous to living organisms and so significant safety issues are involved.

Carbon dioxide detection is useful to detect the presence of animal life (for example, smuggled pets), but it is an invasive technique in that the detector must be manually inserted inside the container.

Millimeter wave imaging can give a low-resolution image of the contents of some containers, especially those made from fabric or thin cardboard. Millimeter imagers are frequently operated in a passive mode in that they only image reflections of natural ambient energy, without the need for an additional emitter, and so the technique has none of the health concerns of X-rays. The image may however be difficult to interpret since objects may look very different in this waveband to what is anticipated by a non-expert observer. Additionally, technical or financial considerations may lead to selection of an imaging sensor with limited resolution, field of view and/or depth of field, all of which make it harder to visualise an overall scene from a single-sensor image.

Thermal imaging can provide a medium-resolution image of the outside of a container in thermal wavebands (i.e. 3-5 μm or 8-12 μm). It is capable of detecting some anomalies in contents leaning against insides of metal-skinned containers.

In general, either imaging is incomplete or the contents are imaged by a technique giving rise to additional problems: as has been said, X-rays are potentially harmful and carbon dioxide detection is invasive and disrupts traffic flow. Passive sensing is desirable from a health and safety point of view, particularly when a checkpoint is accessible by the public, but no single passive imager is able to take images of contents of all containers that are likely to be encountered. Accordingly, passive sensing is only employed effectively if multiple sensors are used to collect images in multiple wavebands. Such an arrangement provides for a more thorough inspection or surveillance than can be achieved with a single sensor.

If a plurality of line-scan imagers, each with a respective sensor modality, are used to provide images in different wavebands then additional problems arise. It is advantageous if images in, for example, the visible, thermal and millimeter wavebands are displayed together to an operator for ready comparison. This assists an operator in detecting anomalies in a container's appearance and content. For example, a shape observed in the visible or millimeter wavebands may look innocuous in itself but, if this knowledge is combined with the fact that the corresponding part of the image of the container also has a thermal signature, then the operator may be alerted and so designate the container as suspicious. Conversely a wasted manual search may be avoided if what appears suspicious in one band (e.g. a thermal signature) may be explained by imaging in another band (e.g. different colour paint having different thermal emissivity). In order to facilitate such useful comparison, images of moving containers collected at different detectors in all three respective wavebands need to be scaled and registered. Moreover, this needs to be done in a short enough timescale to be useful in a real-time system. This has not proved possible in the prior art, without resorting to powerful and expensive computing resources.

The two primary obstacles to registration of images taken using different sensor modalities are that sensor scan patterns differ and there is object motion. The problem of a potentially varying object speed, referred to above, is merely one aspect that must be addressed in facilitating comparison of different images.

All imaging techniques suffer from a potential problem that if object speed is mismatched to image capture speed, image artefacts arise. For example if an object is under-sampled, gaps will appear in the image. Such artefacts detract from usability of an image. Furthermore, different sensor modalities may be affected differently, complicating registration of different images.

If scan speed is assumed constant but true object speed past a sensor varies, then any decrease or increase in speed will cause elongation or compression respectively of the reconstructed image along the object's direction of motion. Image quality and usability is again degraded. As different modalities of sensor are likely to have different scan rates, their images will be affected differently by this speed variation. Registration of images is again made more difficult.

Finally, sensors have different operating wavelengths with potentially different resolutions. This also complicates image registration.

There is a perceived need to provide a scanning system that processes images to form a composite image, which avoids significant image degradation arising from variation in scanning speed.

The present invention provides apparatus for scanning a moving object, the apparatus having a sensor oriented to collect a series of images of the object as it passes through a sensor field of view and image processing means arranged to input the series of images and to form a composite image therefrom, characterised in that the image processing means includes:

a) motion estimating means for generating an estimate of object image motion between images in the series of images; and b) display processing means for generating a composite image to which the series of images contributes at positions derived from estimated object image motion.

Apparatus in accordance with the present invention provides the advantage, that it can be used to image an object that is moving past the apparatus at a speed which is not required to be constant. The invention is in consequence particularly suitable for imaging objects such as driver-controlled moving vehicles, i.e. when vehicle speed is not controlled by an operator of the apparatus. There is increasing demand for effective scanning of cars, vans, lorries and other moving vehicles, at e.g. ports, toll-booths, congestion charging points, weigh-bridges etc. Furthermore, the invention is capable of rapidly processing the image information. This makes it, for the first time, feasible for use in a multi-sensor imaging system, with different sensors operating at different wavelengths.

In a preferred embodiment, the motion estimating means comprises an image analyser for deriving, for each of a number of pixels within a current image from the series of images, a likelihood measure indicating likelihood of the respective image pixel corresponding to a part of the object; and the motion estimating means is arranged to generate an estimate of object image motion between the current image and its predecessor from image pixels weighted in accordance with the likelihood measure.

In this embodiment there is no requirement for the object to fill the instantaneous field of view of the sensor: image pixels are classified as either associated with part of the object or with a scene in which it appears, and this classification is made using information contained within images.

The sensor may have an optic axis aligned to be substantially perpendicular to a direction of motion prearranged for a moving object to be scanned. The current image's predecessor in the series of images may be an immediately preceding image.

The image analyser may be arranged to derive the likelihood measure for each pixel based on a comparison of its intensity in the current image with the intensity of a pixel located equivalently in the current image's predecessor. The likelihood measure may be proportional to the square of the difference between pixel intensity in the current image and the intensity of the equivalently located pixel. The image analyser may be arranged to derive the likelihood measure for each pixel additionally based on a comparison of intensity of the current image pixel with intensity of a pixel in the predecessor estimated to be imaging an object region which is the same as that imaged by the current image pixel, the pixel in the predecessor having a location derived by motion compensation in accordance with an assumption that a current estimate of object image motion represents true image motion.

The likelihood measure may alternatively be derived from intensity of the current image pixel, intensity of a second pixel equivalently located in its predecessor and intensity of a third pixel which is in the predecessor and which is estimated to be imaging an object region which is the same as that imaged by the current image pixel, the third pixel having a location derived by compensation for object motion, and the likelihood measure ($w_f(x,y)$) being given by:

$$w_f(x, y) = \frac{(I_p^t(x, y) - I_p^{t-1}(x, y))^n}{(I_p^t(x, y) - I_p^{t-1}(x, y))^n + (I_p^t(x, y) - I_p^{t-1}(x + \Delta x_i, y))^n + c}$$

where c is a non-negative constant and n is a positive number, for example in the range 1 to 4 or 1.5 to 2.5.

The third pixel may alternatively have a location derived by compensation for object motion, the likelihood measure being derived using estimates of standard deviations □$_f$ and □$_b$ of noise in the object image intensity and background image intensity respectively in accordance with equations as follows:

$$w_f(x, y) = \frac{p_f(x, y, \Delta x_i)}{p_f(x, y, \Delta x_i) + p_b(x, y)},$$

where:

$$p_f(x, y, \Delta x_i) = \frac{1}{\sigma_f\sqrt{2\pi}}\exp\left(-\frac{(I_p^t(x, y) - I_p^{t-1}(x + \Delta x_i, y))^2}{2\sigma_f^2}\right),$$

and $$p_b(x, y) = \frac{1}{\sigma_b\sqrt{2\pi}}\exp\left(-\frac{(I_p^t(x, y) - I_p^{t-1}(x, y))^2}{2\sigma_b^2}\right)$$

The image analyser may be arranged to use a first estimate of object motion to calculate a second such estimate, and thereafter to calculate iteratively the likelihood measure based on an estimate of object motion generated by the motion estimating means in a previous iteration, and the motion estimating means is arranged to generate iteratively an estimate of object motion for a current iteration based on likelihood measures updated using respective previous motion estimates.

The sensor may be a framing sensor with a substantially rectangular field of view and the display processing means is then arranged, for each of the series of images, to take image data from a plurality of strips within the sensor field of view and to generate a corresponding plurality of composite images, each composite image having a contribution from a respective strip in each image. The sensor may be a first sensor and the apparatus then includes at least one other sensor oriented to obtain a respective series of images of the object as the object passes through the at least one other sensor's field of view and the display processing means is further arranged to generate a respective composite image from each series of images in accordance with the estimate of image motion derived from the first sensor's series of images. The at least one other sensor may be at least one of capable of imaging at a different wavelength from the first sensor and oriented along a different direction. The first sensor may be a visible band imager, and the at least one additional sensor is at least one of a visible band imager, a millimeter wave imager and a thermal imager.

The motion estimating means may be an object speed sensor, such as a Doppler radar providing an output signal with frequency proportional to object speed. The apparatus may be arranged to provide a common clock signal to time the Doppler radar output signal and collection of images in the series of images in terms of counts of clock signal pulses. It may be arranged to provide respective frame signals to time images and time/position data derived from the Doppler radar output signal to time object movement, to perform an interpolation to relate image timing to object position and form the composite image from images located in accordance with object position.

In a further aspect, the present invention provides apparatus for scanning a moving vehicle controlled by a driver, the apparatus comprising a sensor oriented to collect a series of images of the vehicle as the vehicle passes through a sensor field of view, and image processing means arranged to input the series of sensor images and to form a composite image of the vehicle therefrom, characterised in that the image processing means includes:

a) image analysing means for deriving, for each of a number of pixels within a current image in the series of images, a respective likelihood measure indicating likelihood of pixel corresponding to a part of the vehicle, the image analysing means being arranged to use information contained within the current image and a predecessor thereof;

b) motion estimating means for generating an estimate of object image motion between the current image and its predecessor from image pixels weighted in accordance with the likelihood measure; and c) display processing means for generating a composite image to which the series of frames contributes at positions derived from estimated object image motion.

In another aspect, the present invention provides a method of constructing a composite image from a series of images taken at a sensor as an object moves through a sensor field of view, characterised in that the method comprises the steps of:

a) inputting a current image for processing;

b) deriving an estimate of object image motion;

c) iterating steps a) and b) for the series of images; and d) constructing a composite image to which the series of images contributes at positions derived from the estimate of object image motion.

In a preferred embodiment, step b) of the method comprises:

b1) for pixels in the current image, deriving likelihood measures indicating likelihoods of respective pixels corresponding to parts of the object;

b2) deriving an estimate of object image motion from image pixel information weighted in accordance with the likelihood measures;

b3) iterating steps (b1) and (b2) until convergence of the estimate or a prearranged iteration limit is reached using the estimate of object image motion derived at step (b2) to update the likelihood measures derived at step (b1), thereby generating a final estimate of object image motion for the current image; and step d) comprises constructing a composite image to which the series of images contributes at positions derived from the final estimate of object image motion.

Step (b) may include comparing information contained within the current image with that contained within a predecessor in order to derive the likelihood measure. It may include for each pixel in the current image implementing a comparison of pixel intensity with that of a pixel at an equivalent location in the predecessor and deriving the likelihood measure using such comparison.

The likelihood measure may be proportional to a square of a difference between its intensity in the current image and that of an equivalently located pixel in the predecessor.

For pixels in the current image, step (b) may additionally include:

b4) compensating for relative object image motion between the current image and the predecessor on the basis of a current estimate of object image motion representing true image motion;

b5) implementing a comparison of intensities of current image pixels with intensities of respective equivalently imaging pixels in the predecessor, and b6) deriving the likelihood measure from comparisons both with equivalently located pixels and with equivalently imaging pixels in the current image and the predecessor.

The likelihood measure for each pixel may be derived from pixel intensity in the current image, the intensity of an equivalently located pixel in the predecessor and the intensity of an equivalently imaging pixel in the predecessor in accordance with an equation as follows:

$$w_f(x, y) = \frac{|I_p^t(x, y) - I_p^{t-1}(x, y)|^n}{|I_p^t(x, y) - I_p^{t-1}(x, y)|^n + |I_p^t(x, y) - I_p^{t-1}(x + \Delta x_i, y)|^n + c}$$

where c is a non-negative constant and n>0.

The measure of foreground likelihood for each pixel may also be derived from estimates of standard deviations $\square_f$ and $\square_b$ of foreground and background noise intensities in accordance with equations as follows:

$$p_f(x, y, \Delta x_i) = \frac{1}{\sigma_f \sqrt{2\pi}} \exp\left( - \frac{(I_p^t(x, y) - I_p^{t-1}(x + \Delta x_i, y))^2}{2\sigma_f^2} \right)$$

-continued $$p_b(x,y)=\frac{1}{\sigma_b\sqrt{2\pi}}\exp\left(-\frac{(I_p^t(x,y)-I_p^{t-1}(x,y))^2}{2\sigma_b^2}\right)$$

$$w_f(x,y)=\frac{p_f(x,y,\Delta x_i)}{p_f(x,y,\Delta x_i)+p_b(x,y)}$$

The predecessor may be that immediately preceding the current image.

The method may include an additional step of constructing respective composite images from at least one additional sensor having a field of view through which the object passes, each respective composite image being constructed by placing each current image from the at least one sensor at a respective position derived from the associated converged estimate of object image motion generated at step (d).

Step (b) of deriving an estimate of object image motion may be carried out using an object speed sensor, such as for example a Doppler radar providing an output signal with frequency proportional to object speed. The method may employ a common clock signal to time the Doppler radar output signal and collection of images in the series of images in terms of counts of clock signal pulses. It may employ respective frame signals to time images and time/position data derived from the Doppler radar output signal to time object movement, to perform an interpolation to relate image timing to object position and form the composite image from images located in accordance with object position.

In a further aspect, the present invention provides a method of constructing a composite image from a series of images captured by a sensor as an object moves through its field of view, characterised in that the method comprises the steps of:

a) associating a respective estimate of object image motion with each image when designated as a current image;

b) associating the current image with a respective position in a data accumulator derived from summation of estimates of object image motion for the current image and like estimates obtained for earlier captured images in the series; and c) iterating steps a) and b) for the series of images and forming a composite image from image central portions located according to respective positions.

Each image central portion may be at least as wide as an associated estimate of object motion. Step (b) may also include the step of incrementing a count accumulator at pixel positions corresponding to those to which data is added to the data accumulator as appropriate to indicate the number of such additions for each pixel, and step (c) may comprise dividing data accumulator pixel values with respective correspondingly positioned count accumulator pixel values.

The method may include weighting both the count accumulator increment and pixel values in a central portion of the current image by left and right weighting factors and to provide weighted increments and weighted pixel values respectively, the weighted increments are added to first and second integral pixel positions in the count accumulator and the weighted pixel values are added to like-located pixel positions in the data accumulator, the integral pixel positions being those adjacent an estimatedly true pixel position derived from summation of object image motion for the current image and predecessors, and the left and right weighting factors being determined having regard to differences between the true pixel position and its adjacent integral pixel positions.

The method may include weighting both the count accumulator increment and pixel values in a central portion of the current image by weighting factors to provide products which are added to corresponding integral pixel positions within respective accumulators, the integral pixel positions being those adjacent an estimatedly true pixel position derived from summation of object image motion for the current image and earlier captured images and the series of weighting factors being determined in accordance with a smooth interpolation function.

Step (c) may comprise the steps of:

(ci) applying a spatial smoothing filter to data in the data accumulator and count accumulator; and (cii) forming the composite image either by dividing data accumulator pixel values by respective correspondingly positioned count accumulator pixel values or by dividing filtered data accumulator pixel values by respective correspondingly positioned filtered count accumulator pixel values, depending on whether or not respective count accumulator pixel values are non-zero in each case.

Step (c) may alternatively comprise the steps of:

(c1) setting an initial neighbourhood range of one pixel for each pixel in the count accumulator;

(c2) implementing a count accumulator summation of pixel values within its respective neighbourhood range for each pixel in the count accumulator;

(c3) implementing a check regarding whether or not the count accumulator summation is significantly non-zero;

(c4) if the check outcome is untrue indicating that the count accumulator summation is not significantly non-zero, iterating steps (c2) and (c3) with increase in neighbourhood range until the check is true;

(c5) for a data accumulator pixel equivalently located to the count accumulator pixel referred to in step (c2), implementing a data accumulator summation over pixel values within a neighbourhood range equal to that for which the check indicated a significantly non-zero summation;

(c6) obtaining a division result by dividing the data accumulator summation by the significantly non-zero count accumulator summation; and (c7) adding the division result to a pixel in a composite image located correspondingly to the count accumulator pixel referred to in step (c2).

The method may employ a plurality of sensors, the sensor obtaining images to form a composite image being a first sensor, and the sensors including a second sensor obtaining data to generate the estimate of foreground image motion, and this estimate being rescaled or interpolated before being associated with a respective image.

The method may include the step of measuring object speed using a speed sensor and deriving from this measurement a respective estimate of foreground image motion associated with each of the series of images.

The sensor may be a framing sensor with a substantially rectangular field of view and step (b) may include the additional step of writing at least one co-located non-central portion of data contained within each of the series of images to respective further image data accumulating means and step (c) may include forming a plurality of composite images from data contained in respective image data accumulator arrays.

In an alternative aspect, the present invention provides a computer-readable medium embodying program code instructions for execution by computer processing apparatus, the instructions relating to processing image data obtained using a sensor having a field of view through which an object moves, characterised in that the instructions embodied in the computer-readable medium provide for:

a) inputting a current image in a series of images for processing;

b) deriving an estimate of object image motion;

c) iterating steps a) and b) for the series of images; and d) constructing a composite image to which the series of image frames contributes at positions derived from respective estimates of object image motion.

In a further alternative aspect, the present invention provides a computer-readable medium embodying program instructions for execution by a computer processor, the instructions relating to processing image data obtained using a sensor having a field of view through which an object moves, characterised in that the instructions embodied in the computer-readable medium provide for:

a) accessing pixel data relating to a current image in a series of images;

b) deriving likelihood measures indicating likelihoods that pixels in the current image are part of the object image, the likelihood measures being derived from information contained with the current image and a predecessor image in the series;

c) deriving an estimate of object image motion from image pixel information weighted in accordance with corresponding likelihood measures;

d) iterating steps (b) and (c) until convergence or a prearranged iteration limit is reached, whichever occurs first, e) using the estimate of foreground motion derived at step (c) to update the measure, of likelihood derived at step (b), thereby generating a final estimate of foreground image motion for the current image;

f) iterating steps (a) to (e) for successive current images in the series of images; and g) constructing a composite image to which the series of images contributes, each image being positioned in accordance with its respective final estimate of foreground image motion.

Embodiments of the invention will now be described, by way of example only, with reference to the accompanying drawings, in which.

Figure 1:
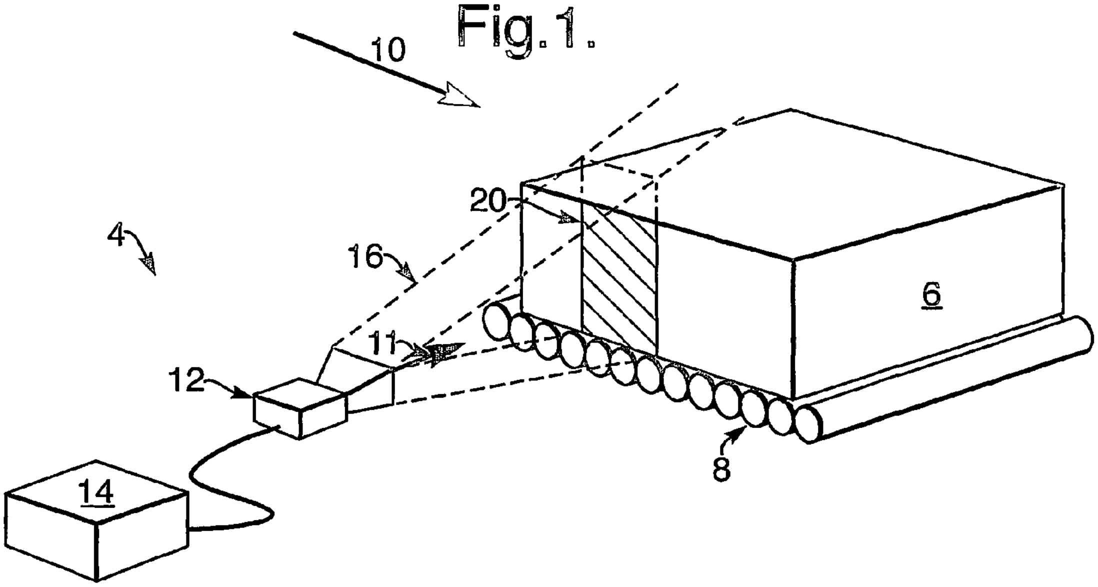
FIG. 1 is a schematic illustration of a first embodiment of a scanning device in accordance with the invention.
Figure 2:
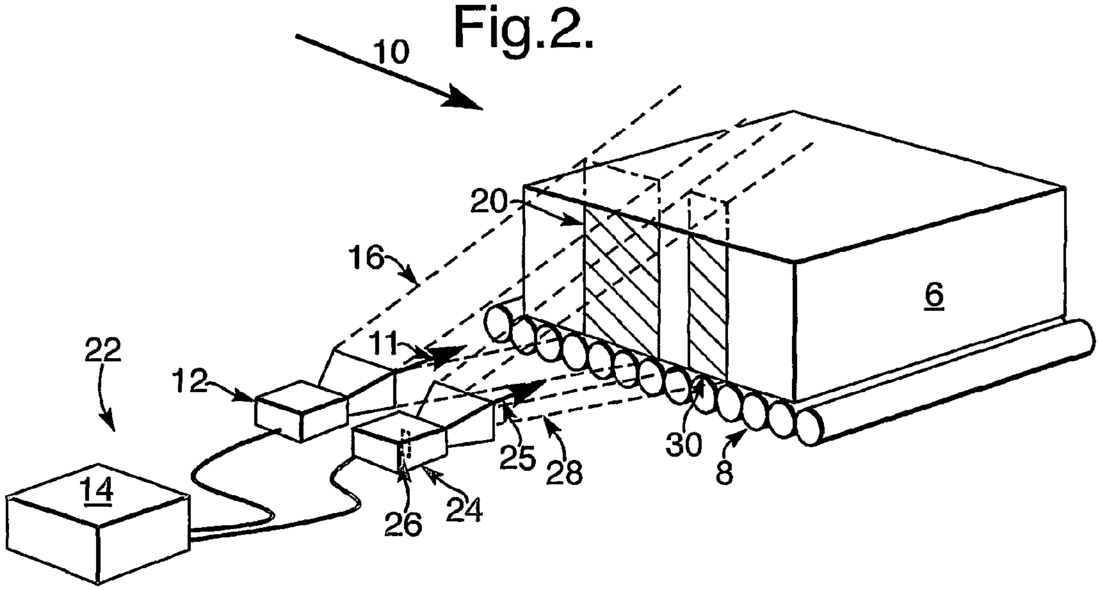
FIG. 2 is a schematic illustration of a second embodiment of a scanning device in accordance with the invention.
Figure 3:
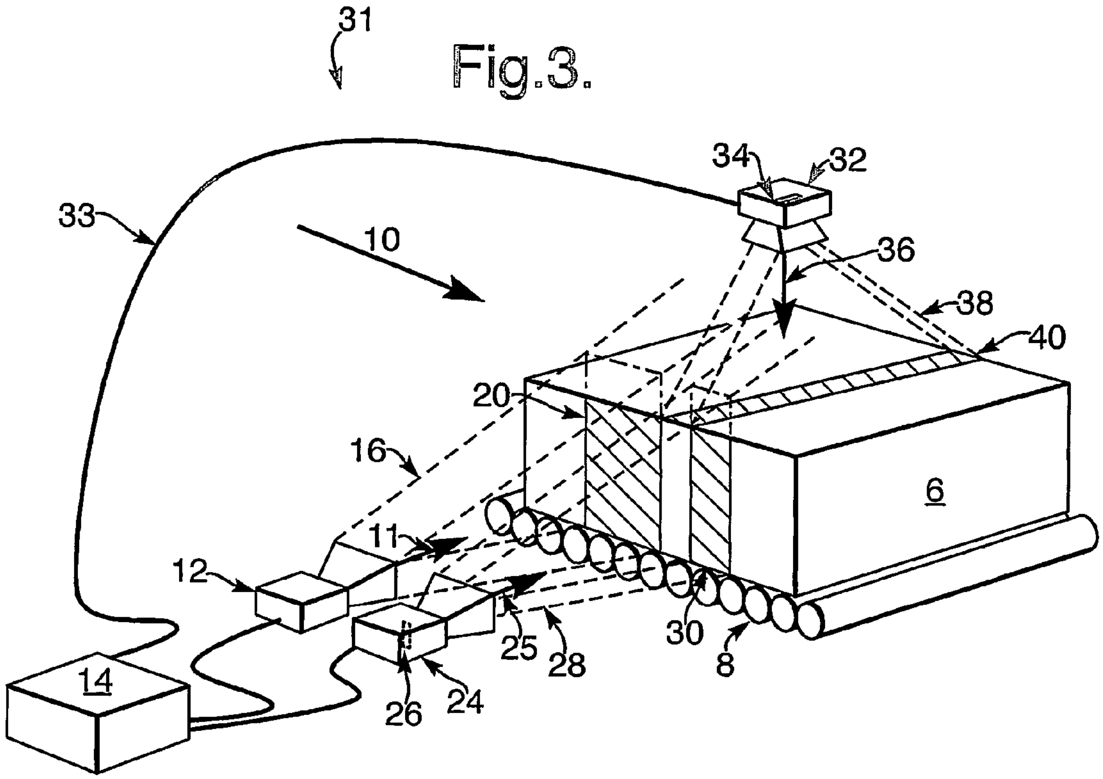
FIG. 3 is a schematic illustration of a third embodiment of a scanning device in accordance with the invention.
Figure 6A:
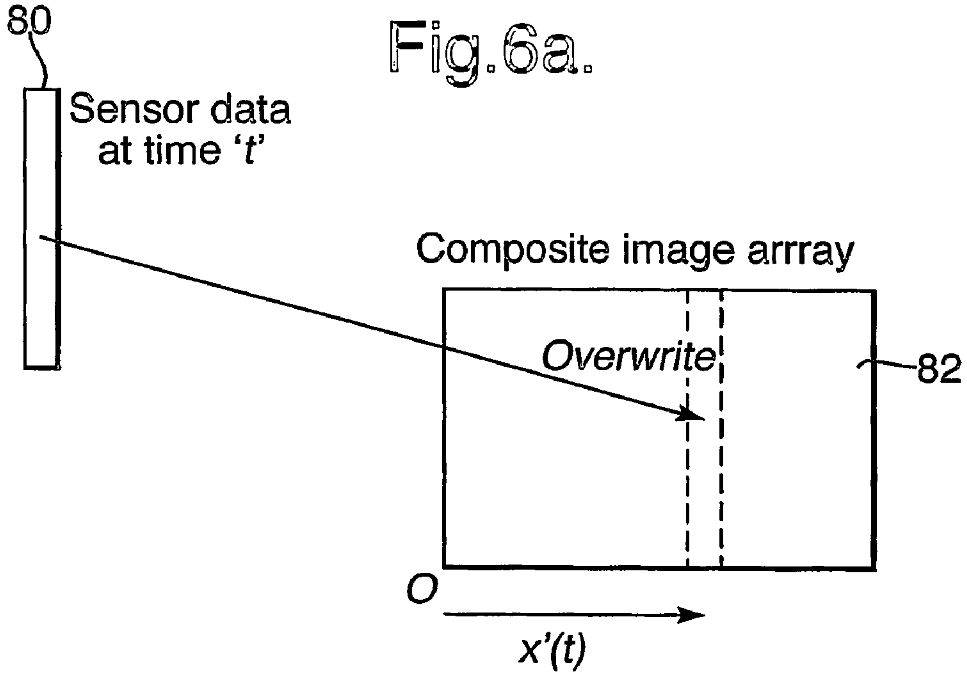
Figure 6B:
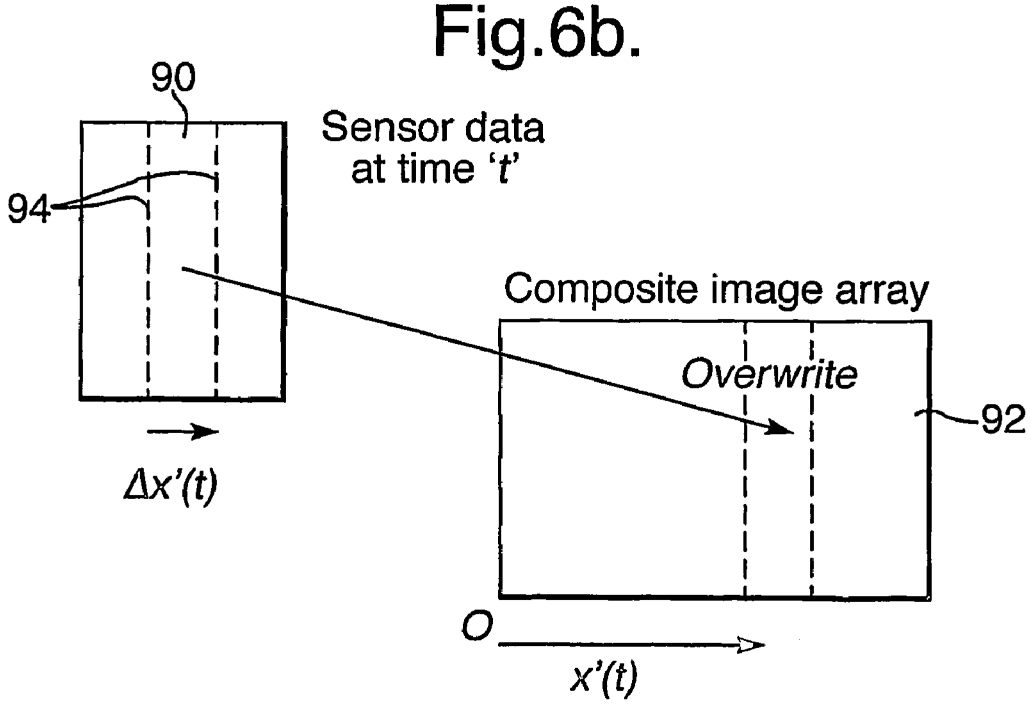
Figure 7:
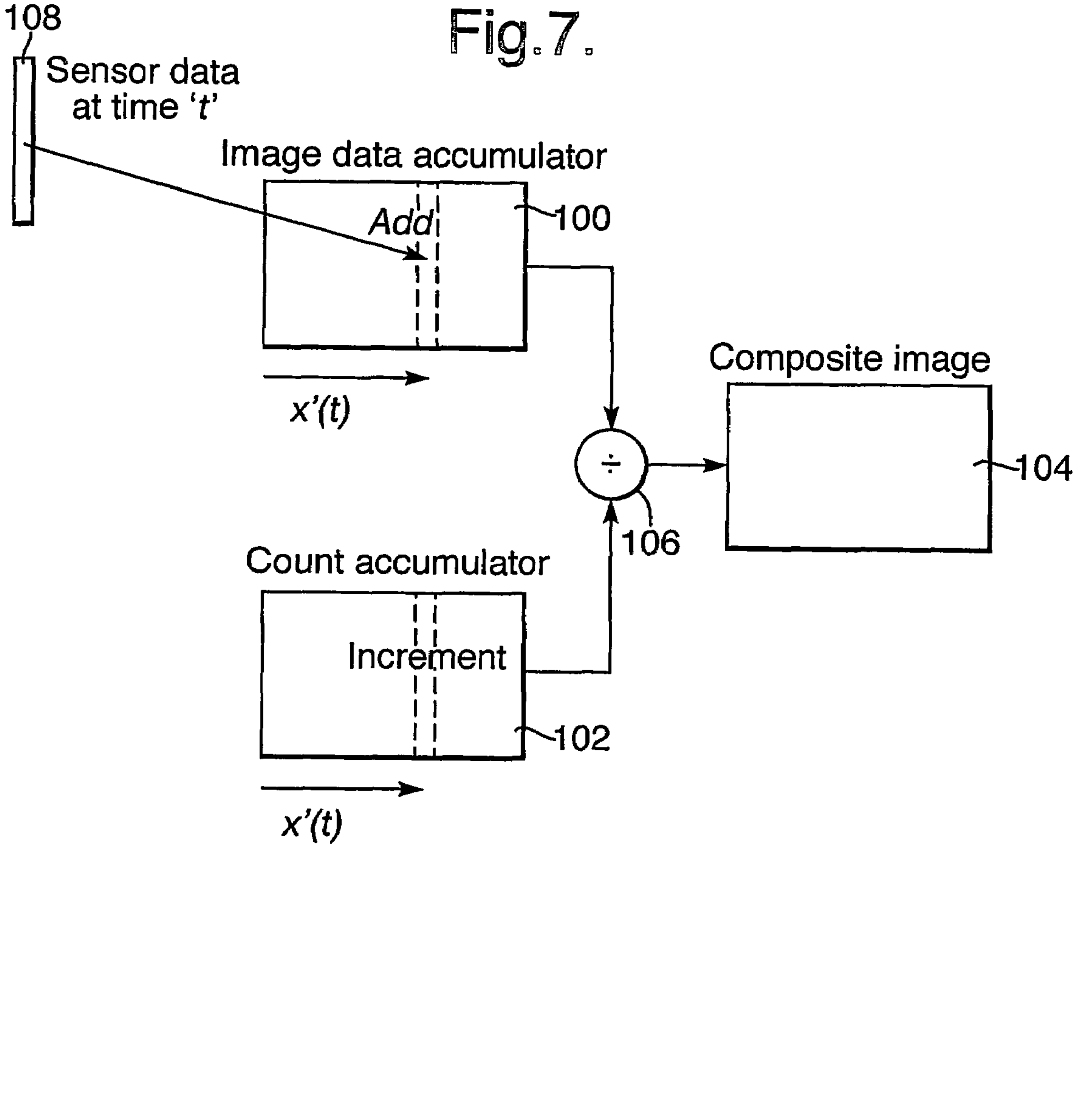
Figure 8:
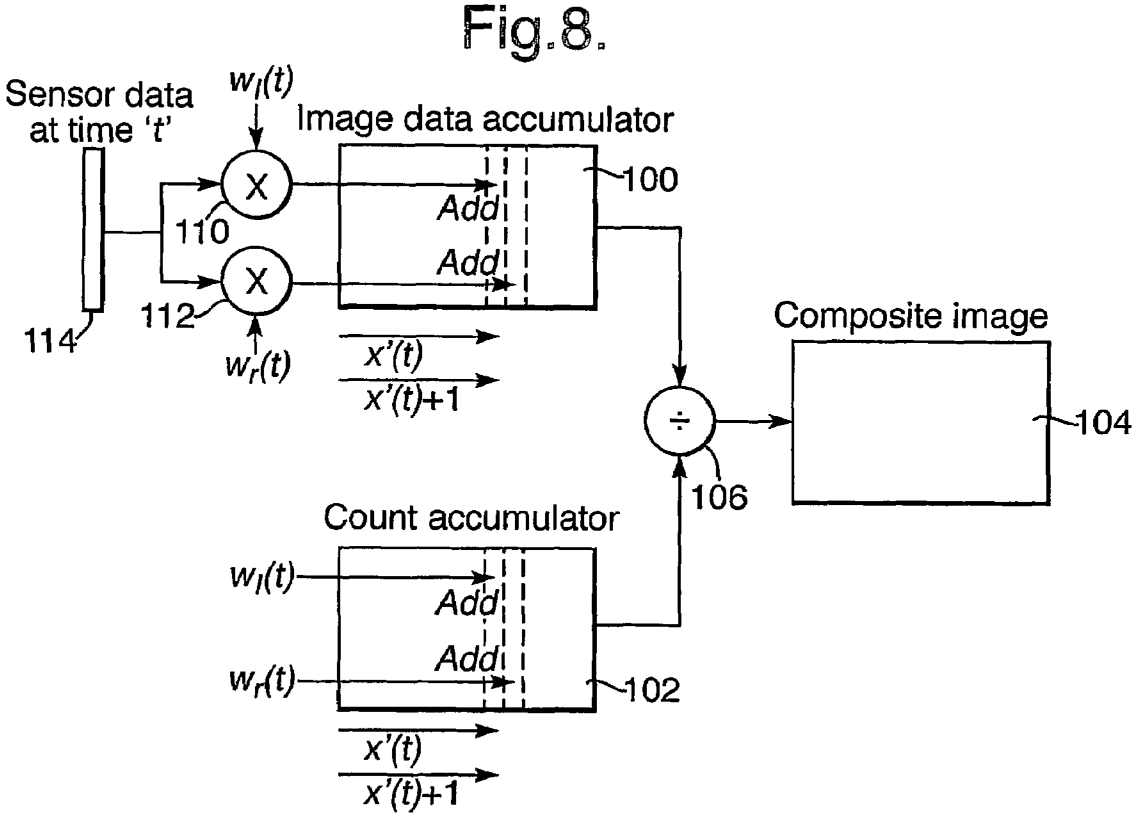
Figure 9:
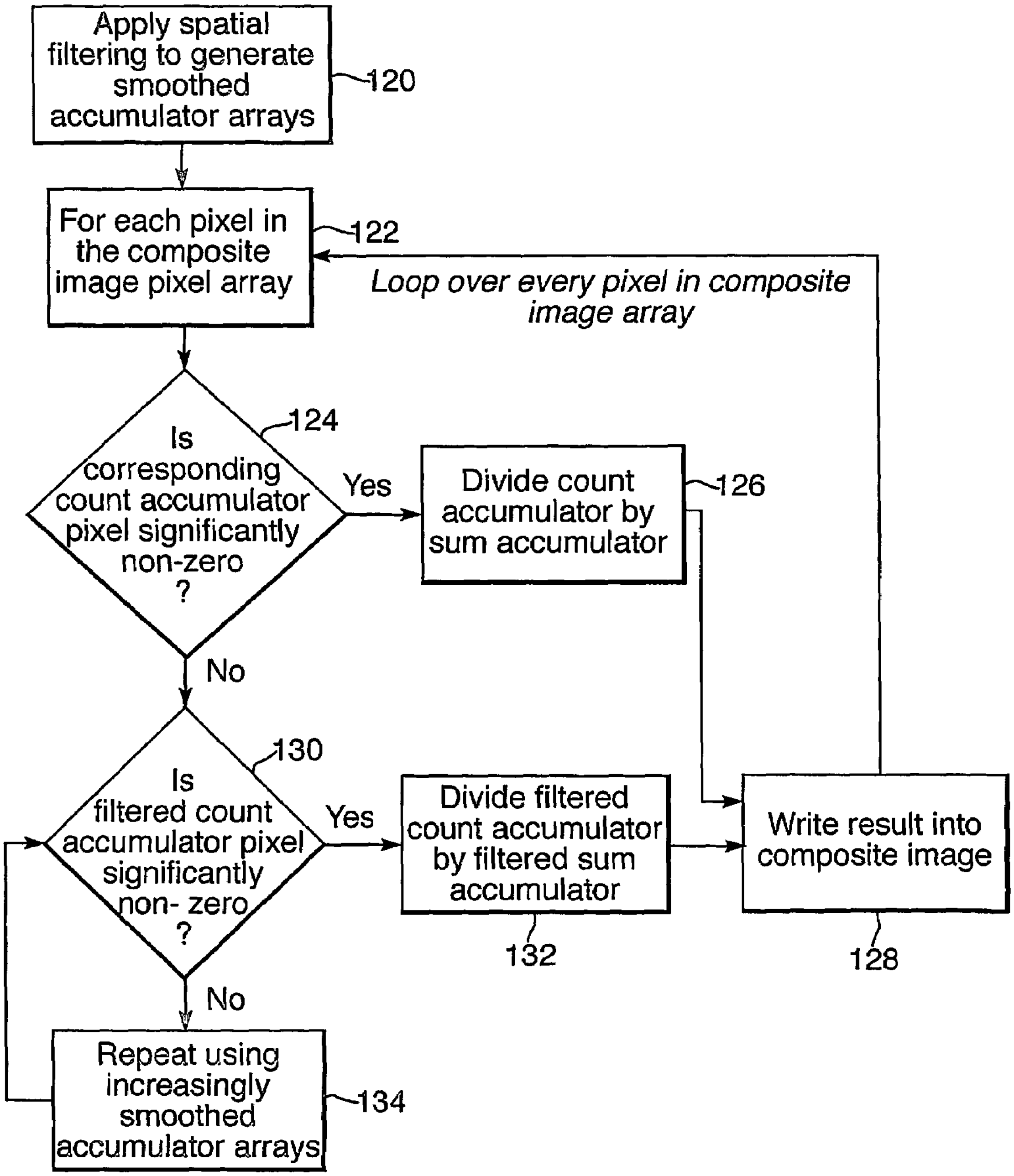
Figure 10:
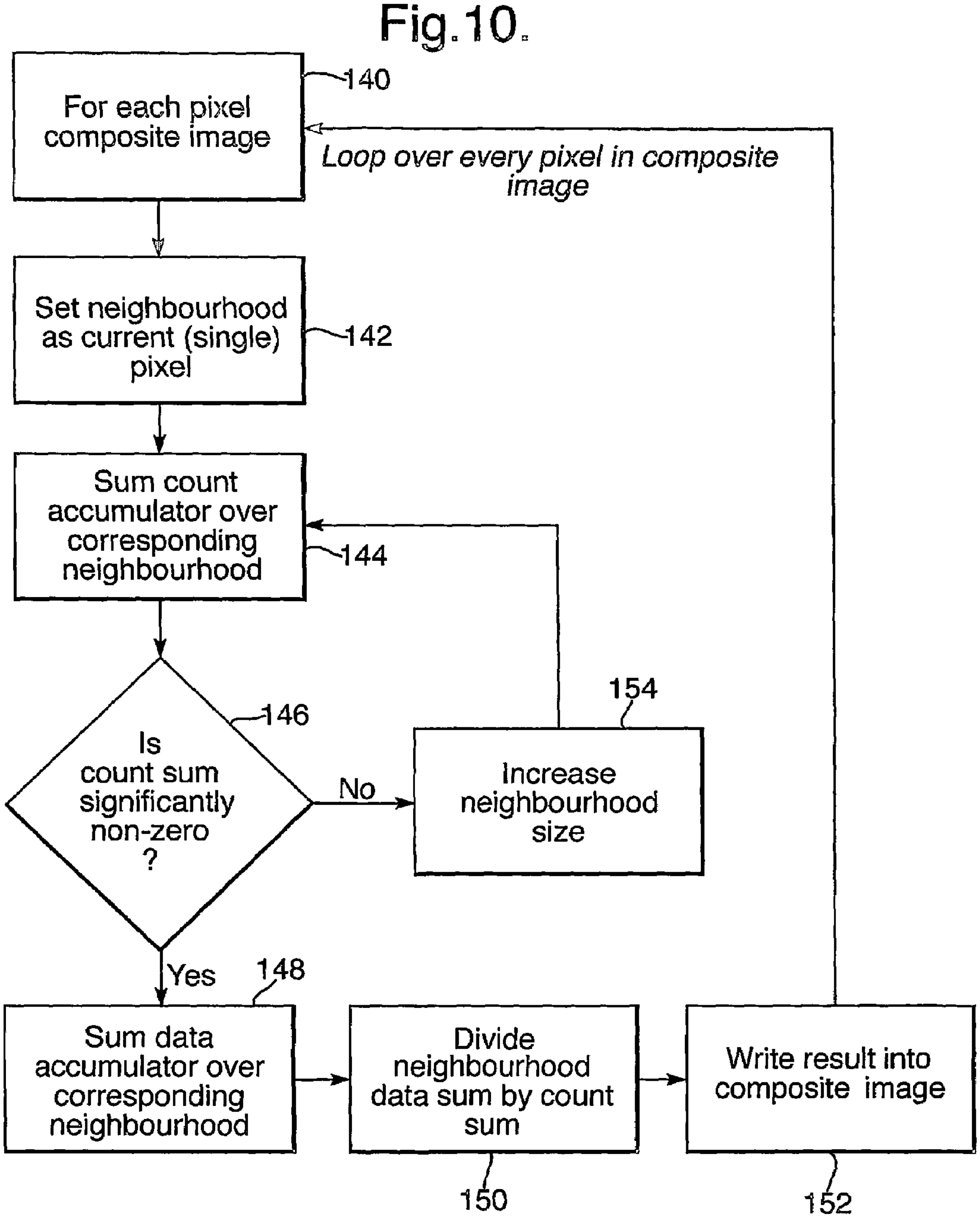
Figure 11:
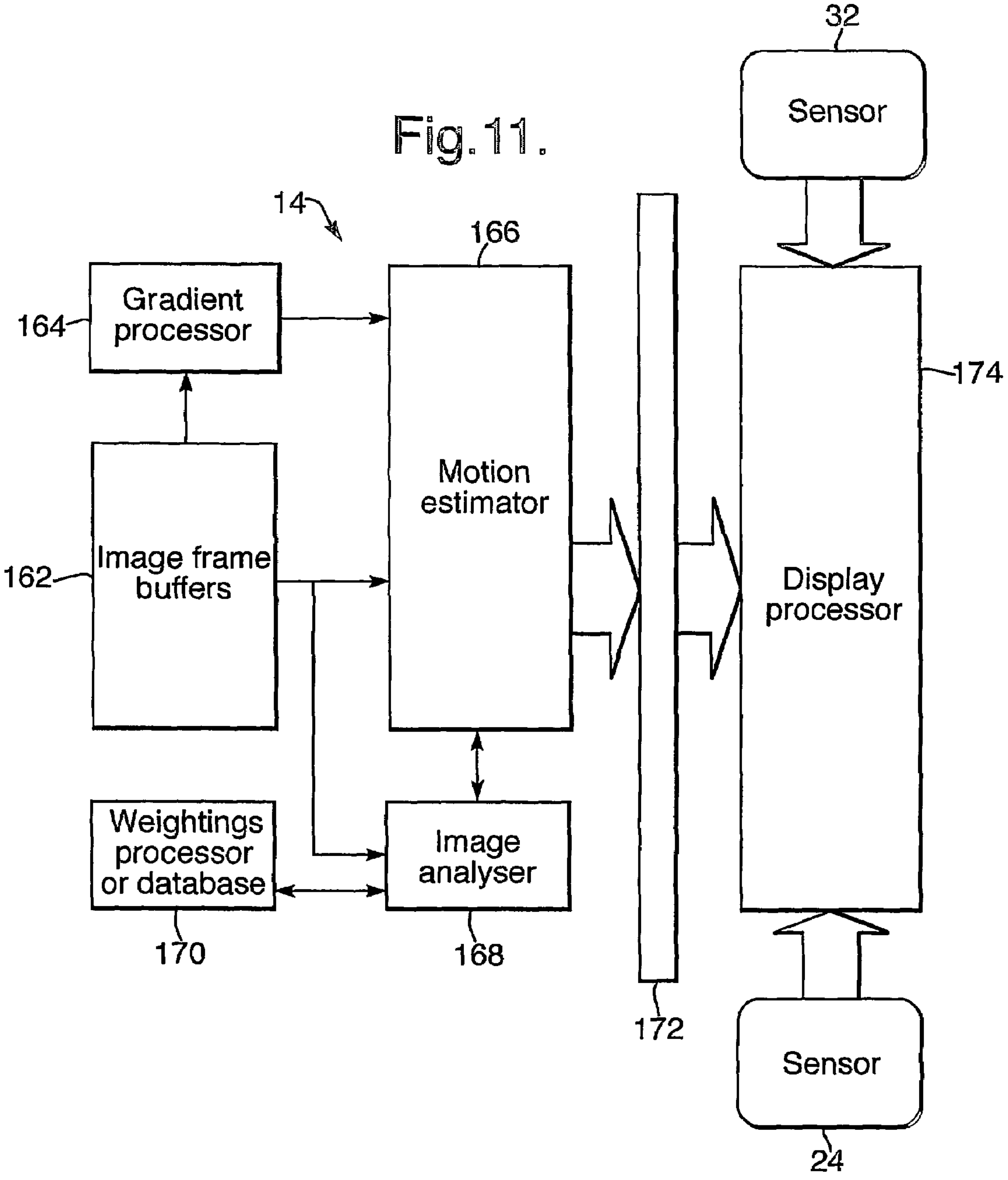
Figure 12:
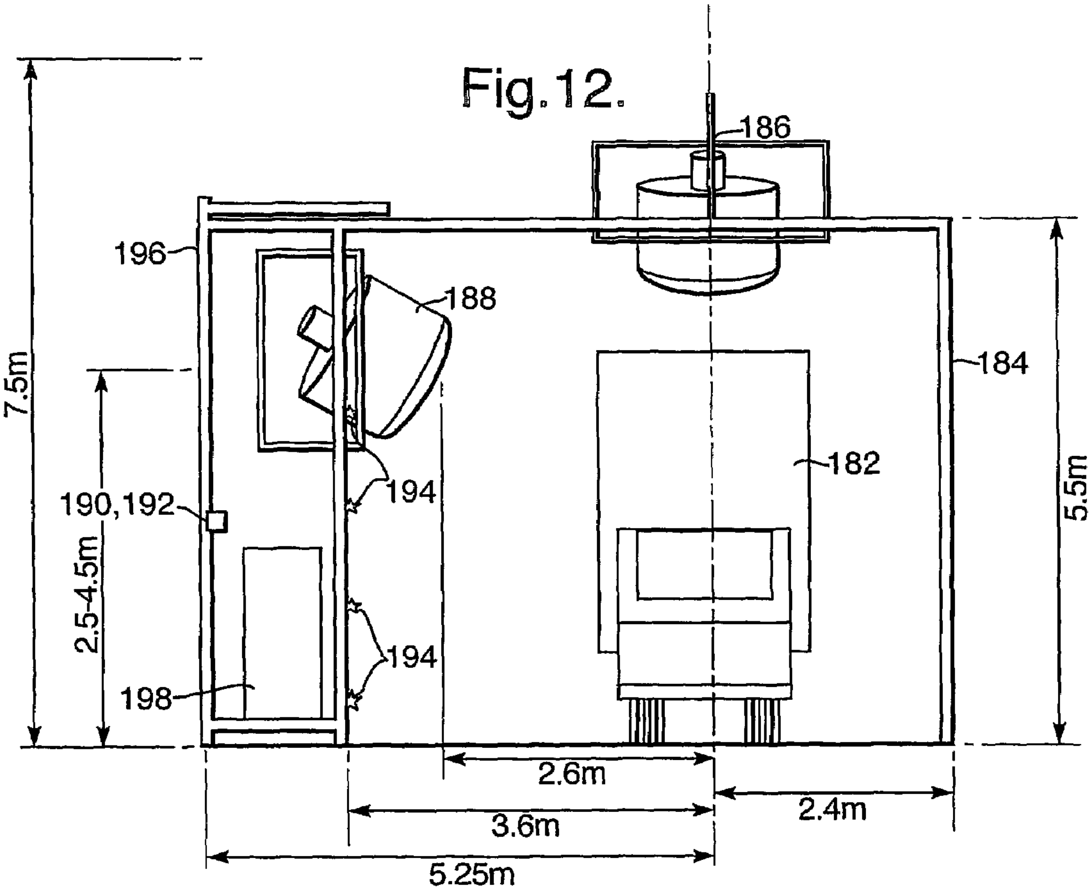
Figure 13:
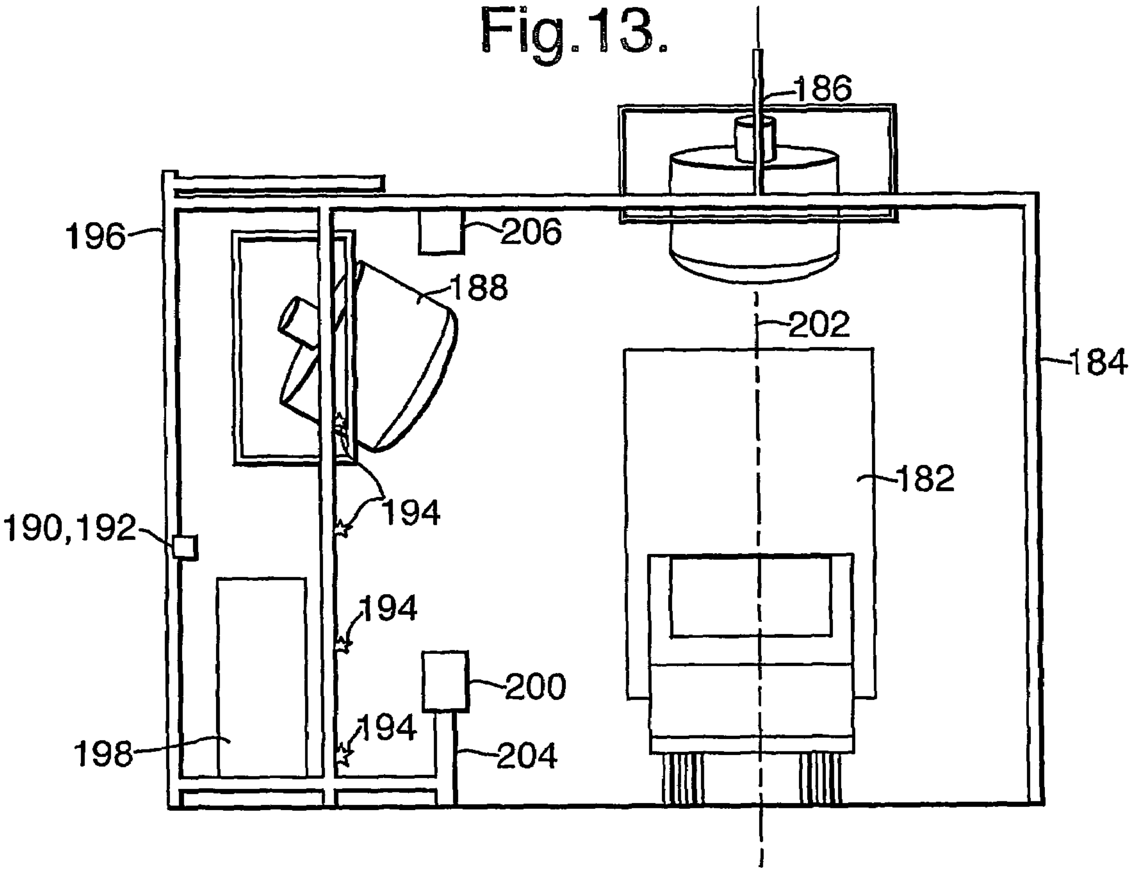

FIG. 6*a* is a schematic illustration of a line-scan image frame obtained from one of the scanning devices of FIGS. 1 to 3 being placed in position within a composite image array;

FIG. 6*b* is a schematic illustration of an image frame obtained from a framing sensor being adapted and placed in position within a composite image array;

FIG. 7 is a schematic representation of a method of composite image reconstruction, which makes use of integration;

FIG. 8 is a schematic representation of a method of composite image reconstruction, which makes use of linear interpolation;

FIG. 9 is a flow chart illustrating the process steps involved in a first method of filling gaps in a composite image generated as shown in FIGS. 7 and 8;

FIG. 10 is a flow chart illustrating the process steps involved in an alternative method of filling gaps in the composite image;

FIG. 11 is a schematic illustration of the components of the image processing unit illustrated in FIGS. 1 to 3;

FIG. 12 illustrates a fourth embodiment of a scanning device of the invention adapted to perform a vehicular scan; and FIG. 13 is a version of the FIG. 12 embodiment with modification to incorporate a separate speed sensor.

FIG. 1 shows a first embodiment 4 of apparatus of this invention for scanning an object in the form of a container 6. A set of rollers 8 convey the container 6 and other containers (not shown) in a direction 10 generally perpendicular to a line of sight 11 of the scanning apparatus 4. The scanning apparatus 4 includes a visible band sensor 12 and an image processing unit 14. The sensor 12 comprises a substantially linear array of detector elements (not shown) each providing a single pixel output: here the expression "linear" means that the number of detector elements in a first direction (long axis) of the array is greater than the number in a second direction (short axis) of the array perpendicular to the first direction. The long axis of the array may be for example up to 1024 pixels in extent, and the short axis may be 1, 3, 8 or more pixels in extent. Use of more than 1 pixel in the short axis improves noise performance; it also allows image data to be used for container motion sensing without the need for a speed measuring device. If the "short" axis is comparatively long, multiple composite images may be produced. Examples of these alternatives will be described later. The array is aligned with its short axis parallel to the horizontal direction of motion 10 of the container 6 and with its long axis in a vertical direction. The number of pixels along the long axis of the array is sufficient to ensure that the sensor 12 has a field of view (indicated by chain lines such as 16) that encompasses a vertical height that is slightly larger, at the roller position, than a maximum height expected for any container to be scanned. At a particular instant in time depicted in FIG. 1, the sensor's field of view 16 covers an area of the container indicated by hatched region 20.

As the rollers 8 are rotated, containers such as container 6, are carried past the sensor 12. Relative motion between object (container 6) and sensor 12 enables the sensor 12 to perform a push-broom scan of the container 6 and record its image as a sequence of image frames. That is, as the scan progresses, successive regions 20 of the container 6 are imaged as respective image frames at the linear array. The image processing unit 14 is arranged to reconstruct a composite image of the entire object from individual image frames. The composite image is then sent to a display (not shown).

In order to reconstruct a full composite image, successive frames must be placed in register with one another. That is, distortion due to varying scan speed (e.g. roller motion) and frame overlap must be eliminated. In order to do this, an estimate of the motion of the container 6 between frames is required. Accordingly, for each image frame that is recorded the image processing unit 14 derives an estimate of the motion of the container 6. The composite image is then assembled by placing each frame within it at a respective position that takes account of the container's estimated motion. The way in which this image reconstruction is achieved, without any a priori knowledge of the object's environment nor assumptions as to the nature of its motion, is a novel feature of this invention. Details will be described later, but in this embodiment the image processing unit 14 reconstructs the composite image only from information contained within individual image frames. In particular, there is no requirement for the container 6 to be moving at a constant speed during scanning or to have any particular shape.

This invention is applicable to the scanning of any object moving relative to a sensor, regardless of the means by which such relative motion is imparted. The container 6 and roller 8 arrangement shown in FIG. 1 (and FIGS. 2 and 3) is for illustrative purposes only. Another arrangement, in which vehicular motion is employed, will be described later in relation to FIG. 12. Moreover, although reference is made to a substantially linear detector array, this is merely a preferred embodiment. It is of course possible to use a wider array and discard image information outside of a particular subset of pixels, if required. In some applications of this invention it may be preferable to make use of a sensor with considerable horizontal width, perhaps even with more pixels in a horizontal direction than vertically.

An alternative form of apparatus 22 for scanning a moving object 6 is shown in FIG. 2. In this Figure, components that are equivalent to those previously described are like referenced. A moving object is again depicted as a container 6 mounted on rollers B. In this embodiment however the scanning apparatus 22 comprises a thermal imager 24 in addition to the visible band sensor 12 and image processing unit 14. In performing a scan, the thermal imager 24 is situated close to the visible sensor 12 and aligned in a parallel direction (i.e. with an optic axis 25 perpendicular to the direction of motion 10 of the container 6). The thermal imager 24 comprises a substantially linear (tall and narrow) array 26 of sensing elements (pixels). The number of pixels in the vertical direction is sufficient to ensure that the imager 24 has a field of view 28 that encompasses a vertical height that is slightly larger, at the roller position, than a maximum height of container expected to be scanned. At the particular instant in time shown in FIG. 1, the visible sensor's field of view 16 covers a first area of the container indicated by hatched region 20; the thermal imager's field of view 28 covers a second area of the container indicated by hatched region 30. As can be seen from comparison of the widths of hatched regions 20 and 30, there is no requirement for short axes of respective imaging arrays to have equal width at the container 6.

In this embodiment 22, motion of the container 6 in the direction of the arrow 10 effects a push-broom scan by both sensors 12 and 24. As this scan progresses, successive regions 20 of the container are imaged by the visible sensor 12 and successive regions 30 are imaged by the thermal imager 24. Two distinct series of image frames are therefore captured and passed to the image processing unit 14 for analysis. The image processing unit 14 reconstructs two separate images of the container 6 from these frame series: the first of these images is in the visible waveband and the second is in the thermal waveband. These two composite images are scaled and output to the display. Scaling ensures that the images are displayed at similar sizes, which aids comparison of information between images. A user-selected option instructs the image processing unit 14 to display the two composite images from different sensor modalities on the same display screen. In the embodiment described, both a thermal image and a visible band image are displayed together, one above the other.

It is in this embodiment 22 that the importance of being able to register the images correctly is more apparent. Not only is it desirable to view an undistorted image of the container 6, i.e. without motion artefacts or frame overlap, it is also important that an operator can compare the two images taken at different wavelengths directly with one another. If an anomaly appears at a certain point in, for example, the thermal image, then it is extremely useful to be able to cross-check it immediately with the same region in the visible image. This can help determine if the anomaly merits further investigation.

The visible image frames detected at the first sensor 12 are used in this embodiment to estimate container motion. These image frames are preferred as resolution is generally higher in the visible waveband than in other wavebands. As the displacement between the two sensors 12 and 24 is known and fixed, container motion can be extrapolated to an appropriate time frame and distortion correction applied to each frame in the thermal image. The size of the linear detector array in the sensor whose image is used for the motion correction is important. No scan is performed in the vertical (y) direction and so the number of pixels along this axis determines the height of the scan and therefore the maximum height of container that can be imaged. As will be explained in more detail later, the array must have a horizontal (x direction) extent which is more than a single pixel wide if motion estimation is to be derived from image information only. This is because, in order to perform the motion correction accurately, it is necessary to have corresponding object parts in successive images from the sensor. The narrower the sensor is, i.e. the smaller its short axis, then the faster is the sensor refresh rate required. The wider the sensor is, then the better is the resulting estimate of image motion, subject to the limiting factor that only one moving object is in the frame at any one time. The specific size of sensor selected is therefore dependent on the application envisaged. A wider array is preferred if there are large gaps between containers being imaged, particularly if the containers are fast-moving and/or bland, in which situation there may be insufficient information in the image with which to determine container motion. On the other hand, if containers are closely following one another, a wider array gives a greater risk of corrupting motion estimation and a narrower array is preferred. If the containers are of a kind that can be further guaranteed to have considerable surface texture, then an array of extent 1024×16 pixels may be used.

An alternative embodiment to that shown in FIG. 2 makes use of a separate sensor to provide frames for motion correction as opposed to utilising those gathered during one of the push-broom scans. This enables a full 2-dimensional (2-D) framing camera to be used as the motion estimation sensor. In this situation therefore a standard CCD video camera with, for example, a resolution of 780×640 pixels operating at 25 frames per second could be employed. By virtue of its horizontal short axis extent approaching that of its vertical long axis, this camera is likely to provide images from which a better estimation of motion can be made. This embodiment however suffers from the disadvantage that it generally requires another sensor to be inserted in what may already be a crowded operating environment.

A further alternative, although more computationally intensive, is to compensate for the motion of the container 6 independently in both frame series. That is, image reconstruction may be entirely self-contained within the frames recorded at each sensor 12 and 24.

The sensor types described above are not intended to exclude the possibility of using other types. It is helpful if the second sensor 24 forms an image which provides complementary information to that formed by the first 12. Although it is preferred that one sensor 12 operates in the visible band, the second 24 may be a thermal imager, as above, or a millimeter wave imager or one that operates in another waveband.

If a thermal imager is used then it should operate in either the 3-5 μm or the 8-12 μm waveband. These wavebands are within the ambient temperature spectral range and accessible with low-cost semiconductor detectors. Solar radiation is however less intense in the 8-12 μm waveband, and so this waveband is preferred if the invention is to be used to image containers which are reflective. This reduces the scope for false signals arising from reflected sunlight.

The two sensors 12 and 24 may be placed side by side (as shown) or one above the other. In this latter case, the imaged areas 20, 30 of the container will partly coincide, and motion compensation using a single image is simplified. Alternatively the second sensor 24 may be placed on the opposite side of container 6 with its line-of-sight antiparallel to that 11 of the first sensor 12. In this arrangement, imaged area 30 is on the opposite side of the object to imaged area 20, which is formed in the visible waveband, and motion compensation is again simplified if estimated using a single image.

A third embodiment of scanning apparatus 31 in accordance with this invention is shown in FIG. 3. Again, components of the apparatus 31 of FIG. 3 that are equivalent to those of FIG. 1 or 2 are like referenced. The scanning apparatus 31 comprises both the visible band sensor 12 and the thermal imager 24 of FIG. 2 and, in addition, a third sensor 32 is connected via a cable 33 to the image processing unit 14. This third sensor 32 may be in the visible band, millimeter wave band or other wavelength range. If the third sensor 32 is not a millimeter wave imager then it also comprises a substantially linear array 34 of sensing elements. If, on the other hand, a millimeter wave imager is used, then its configuration is more complex, although its array 34 of sensing elements are still arranged to cover a substantially linear field of view 38. In either case the third sensor 32 is oriented above the moving container 6 with line of sight 36 directed vertically downwards i.e. perpendicular to both the direction 10 of container motion and the line of sight 11 of the first sensor 12. The array 34 of the third sensor 32 has sufficient sensing elements (pixels) along its long axis to ensure that its field of view 38 encompasses a horizontal width that is slightly larger, at container height, than a maximum width of container expected to be scanned. At the particular instant in time shown in FIG. 3, the visible sensor's field of view 16 covers the first area of the container indicated by hatched region 20; the thermal imager's field of view 28 covers the second area of the container indicated by hatched region 30; and the third sensor's field of view 38 covers a third area of the container indicated by hatched region 40.

In this embodiment 31 of the invention, the motion of the container 6 in the direction of arrow 10 effects a push-broom scan by all three sensors 12, 24 and 32. As this scan progresses, successive side regions 20, 30 of the container are imaged by the visible thermal sensors 12 and 24. If the container walls are opaque to radiation to which the third sensor 32 is sensitive, this sensor provides an image of successive container upper surface regions 40. Alternatively, if the third sensor 32 is a millimeter wave sensor, then it provides an image of the internal container volume. Three image frame series are therefore captured and passed to the image processing unit 14 for analysis. The image processing unit 14 is arranged to reconstruct three undistorted separate images of the container 6 from two side viewpoints and one upper viewpoint.

Again it is important that the three images are correctly registered. The upper image from the third sensor 32 provides a different viewpoint in which to cross-check anomalies appearing in the side images. To facilitate direct comparison of different composite images it is desired to view substantially undistorted images from which motion artefacts have been removed.

In image reconstruction to be described later, there is no restriction placed on the orientation, type or number of sensors for use with this invention. In fact one sensor may be used or, more usefully, any arrangement of sensors that provides complementary images. FIGS. 1 to 3 simply illustrate three possibilities. What is advisable is firstly that the image processing unit 14 in each embodiment is arranged to generate substantially undistorted images of an object being scanned by each sensor; secondly, if motion estimation calculations are not to be unnecessarily complicated, the sensors should preferably all be oriented with their lines of sight substantially perpendicular to the direction of motion of the object(s) being scanned. As mentioned previously, the image correction process is independent of the imaging wavelength, object being scanned and its environment, scanning speed and, in particular, speed variations made during the scan.

Another possible arrangement is to position the second sensor 24 or the subsequent sensor 32 with its line of sight directed diagonally downwards across a vertical plane through its field of view, i.e. towards an edge of the container 6. In this way its field of view encompasses regions on both the side and top of the container, providing a potentially more useful image.

Figure 4:
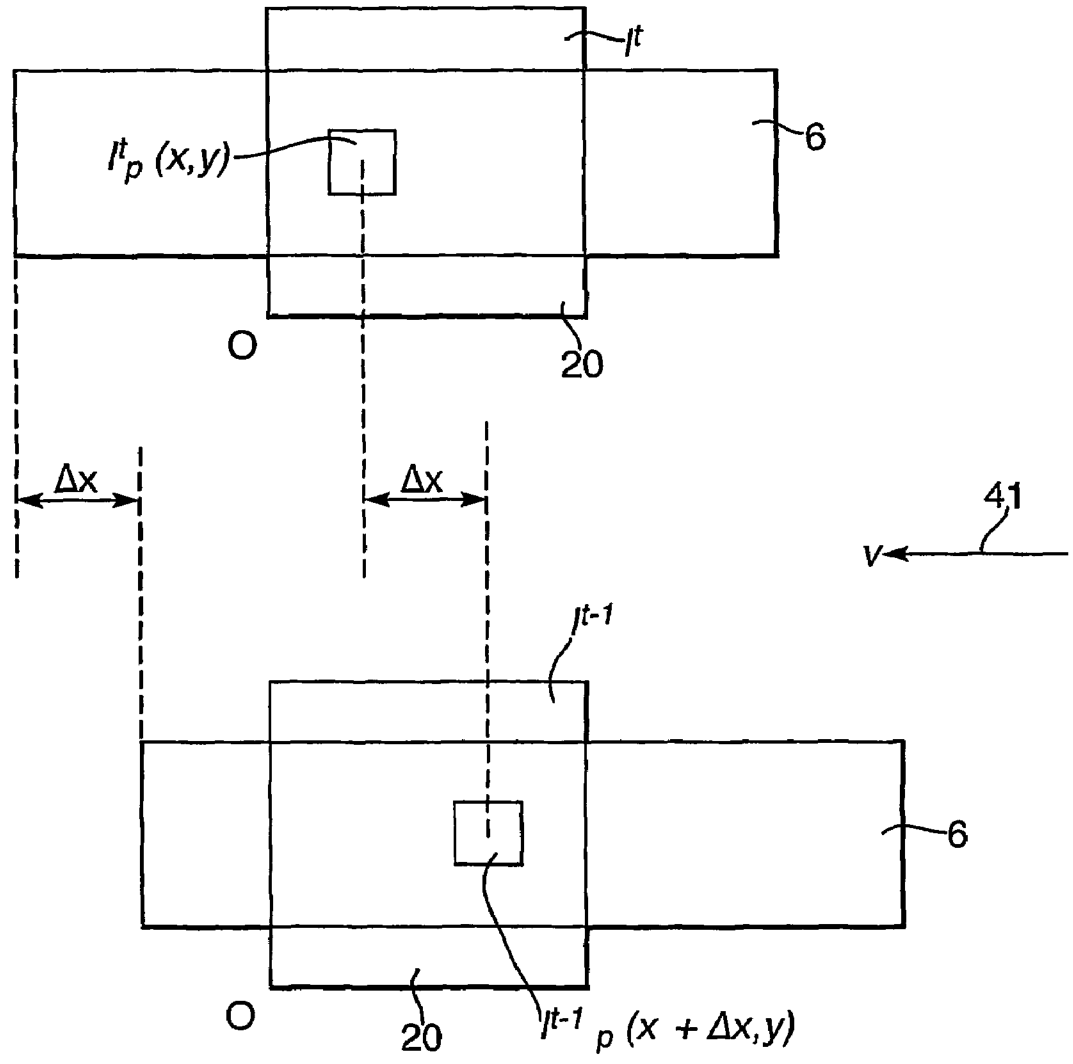
FIG. 4 is a schematic representation of an object moving within the field of view of a sensor component of the scanning device of FIGS. 1 to 3.

To assist description of processing steps involved in reconstructing an image, a notation will be defined as follows. FIG. 4 is a schematic representation of the container 6 and sensor field of view 20 at sensor times t (upper diagram) and t−1 (lower diagram). At sensor time t an image frame $I^t$ is recorded and this is depicted overlying the field of view 20. An immediately preceding image frame $I^{t-1}$ was recorded at sensor time t−1, as illustrated in the lower diagram. Beside both these image frames a Cartesian co-ordinate origin O is indicated at the bottom left hand corner. Between the two frame times t−1 and t, the container 6 is shown travelling towards the left of the drawing at an average velocity v as indicated by an arrow 41 (a different direction to that shown in FIGS. 1 to 3). In the preferred embodiments 4, 22 and 31 of the scanning apparatus, the sensors 12, 24, 32 are oriented such that the container 6 moves in a horizontal (x) direction. The container therefore appears displaced by a distance Δx between the t−1 and t frames.

The image frame $I^t$ comprises information relating to the radiation intensity, in the appropriate waveband, recorded at each detector pixel. Each pixel is identified and indexed by its x and y coordinates. If the sensors 12, 24, 32 are colour imagers then each pixel must be further indexed by a colour-plane value (red, green and blue pixel values). That is, pixellated image information is more completely specified as $I^t(x, y)$ or $I^t(x, y, \text{colourplane})$ (or $I^t$ for short). For convenience, only the $I^t(x, y)$ and $I^t$ notation will be used herein, although it is to be understood that this implicitly includes $I^t(x, y, \text{colourplane})$ pixel identifiers, should this invention be applied to colour images. When referring to individual pixels within a frame $I^t$, these will be denoted by a subscript index p: $I^t_p(x,y)$.

With reference again to FIG. 4, a single pixel $I^t_p(x,y)$ of the current image frame $I^t$ corresponds to the image of a particular region of the object 6. At time t−1, that same object region was estimated to be imaged in the preceding frame $I^{t-1}$ as pixel $I^{t-1}_p(x+\Delta x, y)$, i.e. current image frame pixel $I^t_p(x,y)$ and preceding frame $I^{t-1}$ pixel $I^{t-1}_p(x+\Delta x, y)$ are estimated to be "equivalently imaging". Each object image pixel within the image $I^t(x,y)$ is therefore estimated to be shifted relative to its position in the immediately preceding image frame $I^{t-1}(x+\Delta x, y)$ by an image distance $\Delta x$ expressed as a number of pixels.

It is necessary at this point to distinguish between the nature of components of the image $I^t$. In imaging the moving container 6, each sensor has a field of view 20, 30, 40 that is larger than the container in one dimension. Not all of the imaged scene is therefore moving. That is, some parts of the image (those corresponding to the container's background) will appear stationary whilst other parts (those corresponding to the container/foreground) will appear to move between frames. Pixels containing these image components will be distinguished, if necessary, by reference to background pixels and object pixels.

Figure 5:
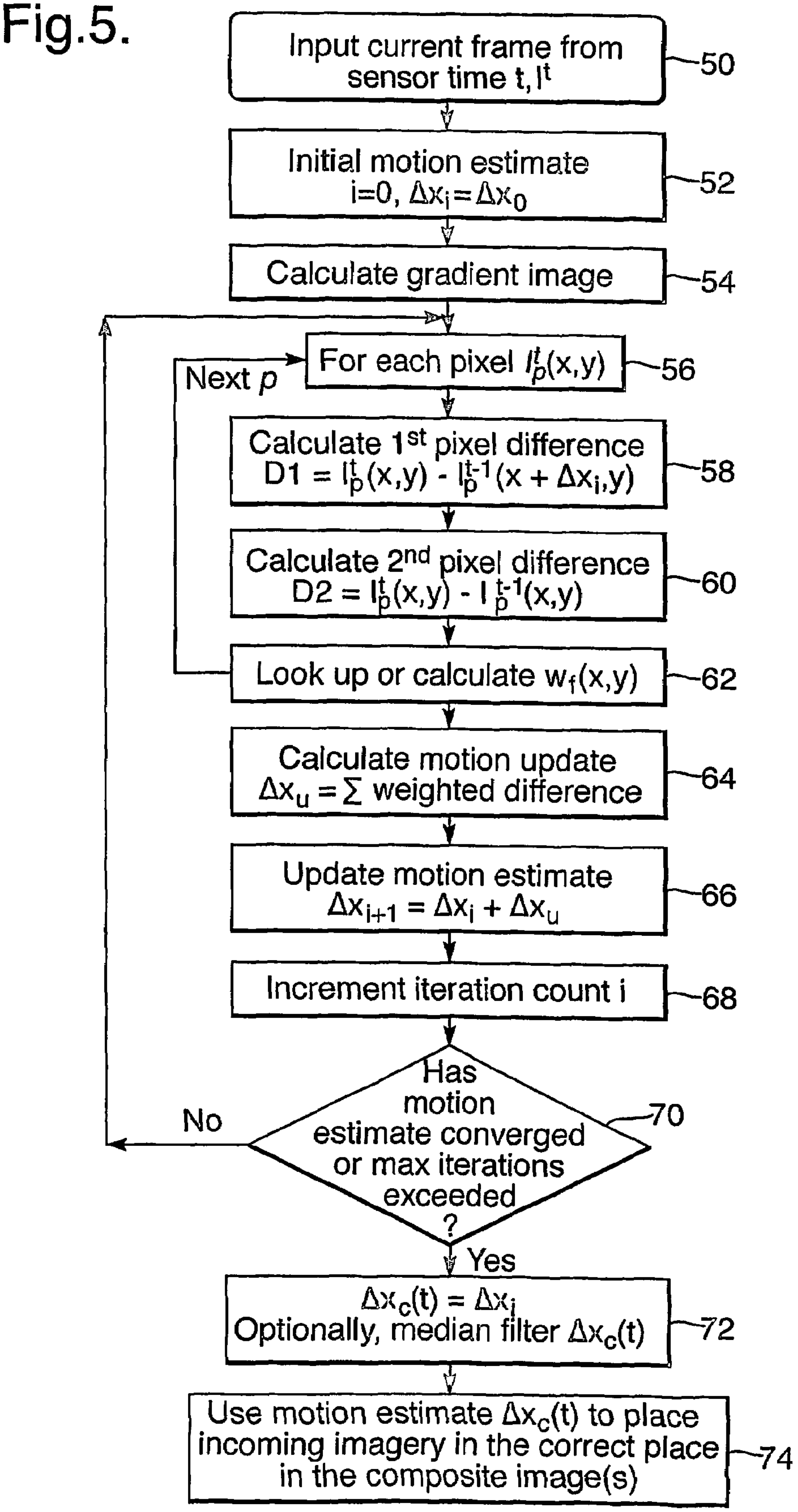
FIG. 5 is a flow chart illustrating the process steps in reconstructing an image from data collected at the scanning devices illustrated in FIGS. 1, 2 and 3.

FIG. 5 is a flow diagram of steps performed by the image processing unit 14 of FIGS. 1 to 3 in generating an undistorted image of a moving object from captured image frames. The steps illustrated relate to a sensor time t at which image frame $I^t$ is recorded. In order to illustrate the novelty of the image processing more clearly, it is assumed that it is only the x position of each pixel in the image that may change. That is, the sensors are assumed to be oriented with their lines of sight substantially perpendicular to the direction of motion of the object being scanned. It will be apparent to one skilled in the art that if the perpendicular distance between the object and a sensor changes during the scan, then the motion model described herein may be adapted to include movement in this second dimension. The adaptations and resulting algorithms are somewhat complex however, and do not assist understanding of the basic invention. Accordingly, they will not be described herein. It is to be noted that the success of a process based on such an adapted model will depend on the sensors 12, 24 and 32 having depths of focus sufficient to maintain a focused image of the container 6 for the time required to capture a series of image frames.

With reference to FIG. 5, at step 50 the image frame $I^t$ is passed to image processing unit 14, which reads pixel locations (x,y) and intensities into memory in preparation for their processing. At step 52, a count parameter i is set to 0 and a motion estimate $\Delta x_i$ is set to an initial estimate value $\Delta x_0$: here $\Delta x_i$ is an ith estimate of the shift of the container 6 to its position in a current frame $I^t$ from its position in an immediately preceding image frame $I^{t-1}$. The initial estimate $\Delta x_0$ may be made from a knowledge of the average or expected speed of the rollers, from an assumption that it is equal to the estimated motion at the immediately preceding frame $I^{t-1}$, or from any other convenient basis. In other applications, for example vehicle imaging, the assumption that the vehicle is travelling at a prearranged speed limit may provide a good first estimate of the image shift $\Delta x_0$. An independent speed sensor, for example a radar gun or lidar sensor, may also be used to provide the initial estimate $\Delta x_0$. In the embodiment of the invention described herein, $\Delta x_0$ is taken to be 0 for all frames. Although it might be expected that using a final estimate made at an immediately preceding frame, which generally more closely approximates a true image shift, would benefit an iterative calculation, this method is not preferred as errors may be perpetuated and upset later iterations.

At step 54 a gradient image is calculated. The gradient image, for an image frame $I^t(x, y)$, is defined as a derivative of the image frame with respect to x, i.e.

$$\frac{\partial I^t(x, y)}{\partial x}.$$

This derivative is calculated in this embodiment using a simple finite-difference filter (although other standard numerical methods may also be used). Typically the filter is a central difference filter i.e. with a kernel of (−½, 0, +½) indicating multipliers of sets of three successive frames $I^t(x-1, y)$ $I^t(x, y)$ and $I^t(x+1, y)$, i.e.:

$$\frac{\partial I^t(x, y)}{\partial x} = \frac{[I^t(x+1, y) - I^t(x-1, y)]}{2}. \quad (1)$$

At this step 54 therefore the variation in pixel intensity across the x direction of the image is therefore computed.

Steps 56 through 68 represent a procedure by which an estimate of the object motion is computed iteratively, ideally until repeated estimates converge to a single value. Firstly, for each pixel $I^t_p(x,y)$ within the current image, steps 56 to 62 are performed. A pixel $I^t_p(x,y)$ to be analysed is addressed at step 56.

At step 58 a first pixel difference D1 is calculated:

$$D1 = I^t_p(x,y) - I_p^{t-1}(x+\Delta x_i, y) \quad (2)$$

D1 is the intensity difference between an image pixel at position (x,y) in the current image imaging a scene region, and an equivalently imaging pixel at a relatively shifted position $(x+\Delta x_i, y)$ in an immediately preceding frame at which the same scene region is estimated to have been imaged. A motion compensated preceding image is now defined: it is an image frame generated by projecting imaged intensities of pixels in a current frame back to respective corresponding pixel positions (relatively shifted by $\Delta x_i$) at which they are estimated to have been imaged in an immediately preceding frame. This is carried out for all current frame pixels other than those which have no corresponding pixels in the preceding frame because of container movement. If motion is estimated sufficiently accurately, intensities of corresponding pixels in the two frames should be equal for all pixels that display the moving container 6 (ignoring intensity fluctuations in the scene over an interval between successive frames) and the difference D1 will tend to zero.

At step 60 a second pixel difference is calculated:

$$D2 = I_p^t(x,y) - I_p^{t-1}(x,y) \quad (3)$$

This represents the difference in intensity between equivalently located pixels in different frames, i.e. pixels at the same frame position in successive image frames. If the imaged scene is stationary, then the difference D2 is zero (ignoring scene intensity fluctuations between frames).

Finally for each pixel, at step 62 a weight $w_f(x,y)$ is either calculated or extracted from a look-up table (not shown). Various methods by which these weights can be calculated will be explained later The weight $w_f(x,y)$ is derived using the current motion estimate $\Delta x_i$ and represents the likelihood that a particular pixel $I^t_p(x,y)$ is foreground (imaging a moving object) or background (imaging a stationary part of a scene). A weight of 1 indicates a foreground pixel and 0 indicates a background pixel.

At step 64 an update $\Delta x_u$ to the current value of the motion estimate $\Delta x_i$ is computed by minimising an intensity error function $E(\Delta x_u)$: this function is a weighted squared pixel intensity difference computed over all pixels as follows:

$$E(\Delta x_u)=\sum_{x,y} w_f(x,y)[I^{t-1}(x+\Delta x_i+\Delta x_u,y)-I^t(x,y)]^2 \tag{4}$$

It is desirable to postulate the effect of the motion estimate update $\Delta x_u$ on the current frame $I^t$, because this avoids a need to recompute a spatial intensity gradient $$\frac{\partial I^t(x,y)}{\partial x}$$

at each iteration. Two approximations are made; firstly that a shift $\Delta x_u$ applied to one image frame $I^{t-1}$ has similar effect to an equal and opposite shift $-\Delta x_u$ applied to the other image frame $I^t$; this allows the $\Delta x_u$ term in Equation (4) to be deleted from the expression for $I^{t-1}$ and replaced by $-\Delta x_u$ in the expression for $I^t$. Secondly, that the effect of a small shift can be approximated using a Taylor expansion introducing the spatial intensity gradient.

$$\begin{aligned} E(\Delta x_u) &= \sum_{x,y} w_f(x,y)[I^{t-1}(x+\Delta x_i,y)-I^t(x-\Delta x_u,y)]^2 \\ &\approx \sum_{x,y} w_f(x,y)[I^{t-1}(x+\Delta x_i,y)- \\ &\quad \left(I^t(x,y)-\Delta x_u\cdot\frac{\partial I^t(x,y)}{\partial x}\right)]^2 \\ &= \sum_{x,y} w_f(x,y)[\Delta x_u\cdot\frac{\partial I^t(x,y)}{\partial x}+ \\ &\quad I^{t-1}(x+\Delta x_i,y)-I^t(x,y)]^2 \end{aligned} \tag{5}$$

From Equation (5), the motion estimate update $\Delta x_u$ can be estimated directly using linear least squares optimisation. This is achieved by setting to zero the derivative of the intensity error function $E(\Delta x_u)$ with respect to the update $\Delta x_u$, which extremises $E(\Delta x_u)$. The resulting extremum is a minimum because the second derivative of $E(\Delta x_u)$ is positive. The update $\Delta x_u$ is determined from a linear equation as follows:

$$\begin{aligned} \frac{dE(\Delta x_u)}{d\Delta x_u} &\approx 2\sum_{x,y} w_f(x,y)[\Delta x_u\cdot\frac{\partial I^t(x,y)}{\partial x}+I^{t-1}(x+\Delta x_i,y)- \\ &\quad I^t(x,y)]\cdot\frac{\partial I^t(x,y)}{\partial x} \\ &= 0 \Rightarrow \Delta x_u\cdot\sum_{x,y} w_f(x,y)\left(\frac{\partial I^t(x,y)}{\partial x}\right)^2 \\ &= \sum_{x,y} w_f(x,y)\cdot\frac{\partial I^t(x,y)}{\partial x}\cdot \\ &\quad [I^t(x,y)-I^{t-1}(x+\Delta x_i,y)] \end{aligned} \tag{6}$$

Moving the summation term on the left hand side of the second line of Equation (6) to become the denominator of the right hand side produces:

$$\Delta x_u=\frac{\sum_{x,y} w_f(x,y)\cdot\frac{\partial I^t(x,y)}{\partial x}\cdot(I^{t-1}(x+\Delta x_i,y)-I^t(x,y))}{\sum_{x,y} w_f(x,y)\cdot\left(\frac{\partial I^t(x,y)}{\partial x}\right)^2}. \square.$$

The summations in the numerator and denominator of Equation (7) are carried out over pixels located in a central portion of the image frames $I^t$ and $I^{t-1}$. This central portion is used because there may be regions for which no corresponding pixels are found once motion compensation has been applied. A strip of width at least equal to $\Delta x_i$ is discarded from either the right or left hand side of the image (depending on the direction of object motion across the sensor) when calculating the motion estimate update $\Delta x_u$. In practice it is simpler to use a fixed central region of the image $I^t$ whose width is anticipated to exceed the maximum image motion.

At step 66 the current motion estimate $\Delta x_i$ is updated with $\Delta x_u$ in preparation for the next iteration as follows:

$$\Delta x_{i+1}=\Delta x_i+\Delta x_u \tag{8}$$

and at step 68 the count indicator i is incremented by 1.

At step 70 the image processing unit 14 performs a check as to whether or not the motion estimate has converged, i.e. is $\Delta x_u \approx 0$, or whether or not the count indicator i reached a certain prearranged limit. If neither of these conditions is satisfied then the image processing unit returns to step 56 and repeats the motion estimation update process using the updated estimate $\Delta_{i+1}$ to compute a new value of $\Delta x_u$. A maximum iteration count is set to avoid the process becoming stuck in an infinite loop: this may arise if iteration generates a series of solutions nearby one another which the image processing unit 14 can't discriminate between. The maximum iteration count also retains the characteristics of a real time implementation when convergence is slow. Although the motion estimates $\Delta x_i$ etc. are strictly speaking displacements, they are also equivalent to velocities because they are displacements in a fixed time $\Delta t$, the frame time. Displacement per frame time has the units of velocity, hence the expression motion estimate.

Iterative steps 56 to 68 inclusive form a procedure by which object motion estimation can be extracted using only information contained within the image frames themselves. There is no assumption that motion is constant between frames: for each frame pair $I^t;I^{t-1}$ and $I^{t+1};I^t$, the motion estimations may well be different. Nor is there any rigid classification of background and foreground. Pixel weightings $w_f(x,y)$ are calculated for each frame and, as will be seen later, do not use any further information than that which is available in that frame.

In situations for which the anticipated motion is expected to be relatively high speed compared to that which can be accommodated by the range of convergence of the motion estimation procedure, the approach described above must be adapted. In such situations motion estimation is embedded in a multi-resolution framework. Images at multiple resolutions are used to refine the estimated motion progressively. Multi-resolution images may be provided by artificially reducing the resolution of a single sensor to a required level by pixel averaging or by image filtering. High speed motion is first estimated (at relatively low accuracy) from low-resolution imagery and then refined at progressively higher resolutions, making use of information previously discarded. Multi-resolution and multi-scale algorithms are well known in the art of image processing, and specifically in the art of optical flow methods, and so this adaptation will not be described further.

If the motion estimate has converged or if the maximum number of iterations has been reached, the current value of $\Delta x_{i+1}$ is taken as the actual motion estimate $\Delta x_c(t)$ for the current frame at sensor time t. The image processing unit 14 then proceeds to a data filtering step 72. At this step, in the preferred embodiment, motion estimates from successive frames are passed through a median filter. The filter contains an odd number (5, 7 or 9) of successive estimates from which it returns a median estimate. Its use enables a limited proportion of erroneous results to be removed. It is noted that the filter introduces some latency into image processing: motion estimates will only be available some frames after the current frame is acquired. A linear smoothing filter may also be applied at this step 72 in order to reduce jitter on the motion estimates $\Delta_c(t)$.

Finally, at step 74, the filtered converged motion estimate $\Delta x_c(t)$ is used to place the current frame $I^t$ at its correct position in the composite image for display. If more than one sensor is present in the scanning device then, in this embodiment of the invention, this motion estimate $\Delta x_c(t)$ is also used, with appropriate resealing, to place the image frames at time t from each of the other sensors $I_1^t, I_2^t, I_3^t, \ldots$ at their correct positions in these sensors' respective composite images.

The issue of resealing arises from the fact that container image velocity is a function both of the container's physical velocity and its distance from the sensor. Conditions under which it is necessary are, for example, if different sensors have different fields of view to that of the sensor that was used to provide the motion estimate $\Delta x_c(t)$ and/or if they are positioned at different distances from the object being scanned. It is straightforward to correct for differences in image velocities if the object is always a fixed distance from each sensor, albeit that this distance varies between sensors. It is more complicated in cases for which the object moves either towards or away from the sensor and so the image velocity changes for a constant real-world velocity. In such situations, range-finding devices (for example, lidar, ultrasonic echo location, etc.) are used to determine the sensor—object distances and hence the appropriate motion estimate resealing for each sensor.

The technique described with reference to FIG. 5 results in a motion estimate $\Delta x_c(t)$ that is a distance expressed as a number of image pixels, which may be or include a fraction of a pixel. It is based upon an Expectation Maximisation (EM) approach. That is, the motion estimate $\Delta x_i$ is updated given the current weights $w_f(x,y)$ and then the weights $w_f(x,y)$ are updated given the current motion estimate $\Delta x_i$. It can be implemented on a 1 GHz Pentium processor.

Central to this example of the invention is determination of the weights $w_f(x,y)$ to be given to each pixel in order to classify the degree to which it is to be considered in the motion estimation as a stationary or moving part of an image. In this example it will be assumed that image background is stationary and image foreground potentially contains moving objects to be imaged. If a pixel cannot be clearly classified as background or foreground then it may incorrectly either contribute to or fail to contribute to the motion estimation. Any classification process which is based on information contained within the image will inherently be sensitive to noise. It should be noted that noise levels within the imagery may vary dramatically depending upon illumination levels, and it is therefore unlikely that noise levels can successfully be assumed constant. There are a number of ways in which pixels can be allocated a classification and three preferred methods will be described herein, each of which have their advantages and disadvantages.

A first method of estimating the weights $w_f(x,y)$ reflects the traditional EM approach. The likelihood $p_f(x, y, \Delta x_i)$ of a particular image pixel being part of the foreground is calculated from:

$$p_f(x, y, \Delta x_i) = \frac{1}{\sigma_f \sqrt{2\pi}} \exp\left(-\frac{(I_p^t(x, y) - I_p^{t-1}(x + \Delta x_i, y))^2}{2\sigma_f^2}\right) \quad (6)$$

Similarly, the likelihood $p_b(x,y)$ of that pixel being background is given by:

$$p_b(x, y) = \frac{1}{\sigma_b \cdot \sqrt{2\pi}} \exp\left(-\frac{(I_p^t(x, y) - I_p^{t-1}(x, y))^2}{2\sigma_b^2}\right) \quad (7)$$

where $\sigma_f$ and $\sigma_b$ are estimates of standard deviations of noise in foreground and background intensities respectively; as previously mentioned $\Delta x_i$ is the estimate of foreground motion at iteration i in steps 56 to 68 of image processing and $I_p^t$ and $I_p^{t-1}$ refer respectively to pixels in the current and immediately preceding image frames $I^t$ and $I^{t-1}$ in the frame series. Only the foreground likelihood $p_f$ changes as the motion estimate $\Delta x_i$ is updated. The background likelihood $p_b$ remains constant. Foreground likelihood $p_f$ is based on the difference in intensity (D1, Equation (2)) between the current image pixel $I_p^t$ associated with a point on the object and the immediately preceding pixel $I_p^{t-1}$ estimated to correspond to the same point on the object. If the intensities of these pixels $I_p^t$ and $I_p^{t-1}$ are equal, it follows, to a good likelihood, that the pixel has moved as a result of object motion and is therefore foreground. The greater the difference in intensity between these two pixels, then the less likely are they to correspond to the same point on a foreground moving object, and accordingly the associated likelihood estimate $p_f$ will be relatively low. Similarly, background likelihood $p_b$ is based on a comparison of intensities of the current pixel in one image and that at the same position in the immediately preceding image (intensity difference D2, Equation (3)). If the intensities of these two pixels are the same, there is a relatively high likelihood (compared to the case when they are different) that a part of a scene imaged at that pixel position has not moved and the pixel therefore corresponds to background. From the probabilities $p_f$ and $p_b$, a weight $w_f(x, y)$ is derived for each pixel (co-ordinates x, y), which determines its contribution to motion estimation:

$$w_f(x, y) = \frac{p_f(x, y, \Delta x_i)}{p_f(x, y, \Delta x_i) + p_b(x, y)} \quad (8)$$

The weight $w_f(x, y)$ is constrained to lie in the range 0 to 1.

Returning now to step 62 in FIG. 5, the value of $w_f(x, y)$ is either calculated or extracted from a look-up table. The standard deviation of the noise is a function of the sensor system and is assumed to be constant. If a look-up table is used, then the differences D1 and D2 are the only variables in the ultimate calculation of the weights $w_f(x, y)$. The differences D1 and D2 are therefore used as indices or addresses for storage locations in the look up table. This method is quicker and less computationally intensive than performing calculations for each pair of differences D1, D2.

The disadvantage of traditional EM weight calculations is that they are based on probability distribution functions from which pixel weights are derived. These functions normally have a number of free parameters: in image processing applications the free parameters may refer to anticipated levels of image noise, as described herein. Incorrect selection of these parameters causes degradation in performance. It is an advantage of both the second and third methods of calculating weights $w_f(x, y)$ described herein that neither relies on any free parameters.

The principle behind the second method is that background pixels will have relatively small differences in intensity from one frame to the next. In contrast, foreground pixels will show significant intensity variation as they will correspond to different regions of the object. Accordingly, in this method the weight $w_f(x, y)$ associated with each pixel is:

$$w_f(x, y)=(I_p^t(x, y)-I_p^{t-1}(x, y))^2 \tag{9}$$

This method makes use of only the second pixel difference D2 calculated at step 60 in FIG. 5, which is used directly to provide a measure of likelihood that a particular pixel is foreground. The method is computationally simple to implement and accordingly is attractive if real-time image reconstruction on modest hardware is required. It has shown better results in terms of correct motion estimation than the first (EM) method, and does not rely on a good estimate of image noise. Its disadvantage is that each weight $w_f(x, y)$ is not constrained and an anomalous pixel will be given a large weight, even although such a pixel may not be representative of true object motion. For this reason, this second method should not be used if anomalies, e.g. sun glint, are expected to affect the scene during a scan.

A third weighting scheme has been used which is more robust than the second and also avoids the need for an estimation of the standard deviation of image noise. It can be implemented in a general format, which permits increasing selectivity between foreground and background as the value of an index n is increased. The weights $w_f(x, y)$ are calculated in this scheme as:

$$w_f(x, y) = \frac{|I_p^t(x, y) - I_p^{t-1}(x, y)|^n}{|I_p^t(x, y) - I_p^{t-1}(x, y)|^n + |I_p^t(x, y) - I_p^{t-1}(x + \Delta x_i, y)|^n + c} \tag{10}$$

where c is a small non-negative constant, which is included to prevent potential divide-by-zero problems. A value of n equal to 2 has been found to work well, although it is to be borne in mind that variations in selectivity may prove beneficial in more or less noisy images:

$$w_f(x, y) = \frac{(I_p^t(x, y) - I_p^{t-1}(x, y))^2}{(I_p^t(x, y) - I_p^{t-1}(x, y))^2 + (I_p^t(x, y) - I_p^{t-1}(x + \Delta x_i, y))^2 + c} \tag{11}$$

The change from modulus signs $||^n$ in Equation (10) to brackets $( )^2$ in Equation 11 is because squaring makes a term positive and moduli are unnecessary. The principle behind this third method is again that motion is indicated if the difference (D2) between the current pixel intensity and that of the pixel at an equivalent position in the immediately preceding image frame is significant. This is more especially true if the difference (D1) in intensity between the current pixel and an equivalently imaging pixel (i.e. imaging the same object region) in the immediately preceding image frame is small. Accordingly both differences are incorporated into this weighting scheme; Conversely, if the intensity difference between pixels at equivalent positions in the current and immediately preceding image frames is small, then the pixel is likely to be background. In this instance, the above weight will tend to 0. At the first iteration for each input image frame $I^t$, indicated in FIG. 5, when the motion estimate $\Delta x_i$ is set at its initial value $\Delta x_0$, these weights are set to 0.5. Afterwards, on determination of D1 and D2 by the image processing unit 14, D1 and D2 are used as indexes to a look up table which returns the value of the weight $w_f(x,y)$.

Referring once again to FIG. 3, for all sensors 12, 24, 32, each image frame $I^t$ covers only a portion 20, 30, 40 of the object. The movement of the container 6 past each sensor provides scanning motion which enables the whole container to be imaged in a series of frames. Accordingly, knowledge of the distance that the container 6 has travelled at sensor time t is required in order that each image frame taken by the sensors 12, 24 and 32 at that time may be included by the image processing unit 14 at its correct location in the corresponding composite image. In this embodiment of the invention, image frames $I^t$ taken from the sensor 12 are used to derive the motion estimate $\Delta x_c(t)$ for the container 6 at each frame time. The $\Delta x_c(t)$ values generated using the technique described with reference to FIG. 5 will be in units of pixels of the visible waveband sensor 12. These values are determined to a resolution of a fraction of a pixel.

FIGS. 6*a* and 6*b* illustrate schematically an image frame 80, 90 being placed in position within a composite image array 82, 92. Reference will be made to a composite image co-ordinate system with origin O indicated at the lower left hand side of the composite image arrays 82, 92. In FIG. 6*a*, the image frame is taken with a sensor such as the visible waveband sensor 12 of FIG. 3. That is, it is in the form of a thin strip of image data. In FIG. 6*b*, the image frame 90 has been taken by a framing sensor (a sensor that captures entire rectangular image frames with long and short sides or comparable extent), as opposed to the substantially line-scan visible waveband sensor 12. Accordingly, a wider image frame 90 is illustrated and dashed lines 94 indicate where this wider image frame 90 is cropped before further data processing, for reasons that will be given later.

In terms of the composite image co-ordinate system, the distance that the container 6 has moved in the x direction at sensor time t can be calculated by successive summation of all motion estimates $\Delta x_c(t)$ extracted from the present frame and all previous frames. That is:

$$x(t) = \sum_{n=0}^{t_0} \Delta x_c(t-n) \tag{12}$$

where $t_0$ represents the time at which the first image frame was collected. The image processing unit 14 will contain a composite image array 82, 92 for each sensor 12, 24, 32 in the scanning apparatus. For the purposes of FIGS. 6*a* and 6*b*, sensors for which images are being reconstructed are assumed to be those that also provided frames for motion estimation. That is, the visible waveband sensor 12 in the case of FIG. 6*a*. The composite image arrays 82, 92 of FIGS. 6*a* and 6*b* comprise an array of pixel positions, with resolution equal to the pixel resolution of the respective recording sensor in each case. Because data cannot be written to a fractional pixel position, the distance x(t) (in units of pixels) in Equation (12) is therefore rounded to the nearest integer:

$$x'(t) = \left\lfloor x(t) + \frac{1}{2} \right\rfloor \tag{13}$$

where the "floor" operator "⌊ ⌋" provides the largest integer not exceeding its argument $$x(t) + \frac{1}{2}.$$

This rounds down fractions of less than half a pixel and rounds up fractions of half a pixel or more.

With reference to FIG. 6*a*, the image frame 80 taken at sensor time t is written to corresponding pixels in the composite image array 82 at a number of pixels x'(t) from the origin O.

Referring now to FIG. 6*b*, the image frame 90 is, as stated, recorded using a framing sensor (not shown). By reconstructing the composite image using motion estimation as described herein, the assumption has been made that the container 6 is imaged using a narrow bundle of rays perpendicular to it. While this assumption is valid when data is collected using a line-scan sensor, it is not so when the sensor is a framing sensor having a wider field of view in the direction of container motion. In this case, the image 90 is cropped horizontally as indicated by chain lines 94, in order to ensure that only data recorded within a narrow ray bundle is used in the composite image. Preferably, the sensor image 90 is cropped at 94 adaptively by selecting a region based on the current motion estimate $\Delta x_c(t)$. That is, the width of a cropped region between lines 94 is dependent on the motion estimate $\Delta x_c(t)$. If the container is moving quickly, a wider section of data is used in order to avoid gaps appearing in the composite image. Conversely, if the container 6 is moving slowly, a narrow section of data is used in order to limit to the narrowest possible ray bundle and consequent geometric fidelity in the image. The width of the data section used is constrained to be an integral number of pixels, and accordingly is set at $\Delta x'(t)$, as shown in FIG. 6*b*, the integer next largest (in magnitude) to the motion estimate $\Delta x_c(t)$. It is preferably selected from near the centre of the sensor's field of view, as this corresponds to rays that are largely perpendicular to the container 6. As in FIG. 6*a* the frame data are written to the composite image array 92 at position x'(t).

In other embodiments of this invention, it is possible to reconstruct images using data extracted from elsewhere in the framing sensor's field of view, provided that the location of each data strip is selected consistently. If the sensor has considerable width in the horizontal direction (i.e. admits a broad ray bundle), then it is even possible to reconstruct multiple images, each with a different perspective on the container 6. That is, multiple composite images, each assembled from image information contained in a respective area of the sensor's field of view, can be reconstructed using the method described above. Data acquired from the centre of the field of view provide a perpendicular view of the container 6; data acquired from the edges of the field of view provide oblique perspectives of the container 6, using non-perpendicular rays. These composite images effectively represent the container 6 imaged from different viewpoints. The ability to provide views around the container 6 is particularly advantageous if the container does not have planar sides, and assists for example in defect or anomaly detection. Construction of composite images from different effective viewpoints by this method is achieved without requiring any additional information (for example, 3 dimensional structure of the container) than is required for image construction from a single, perpendicular viewpoint as described herein.

If composite image reconstruction described with reference to FIGS. 6*a* and 6*b* is performed for one or more sensors 24, 32 in addition to the sensor 12 used in deriving the motion estimate $\Delta x_c(t)$, then some resealing and/or interpolation may be required. If angular pixel resolutions of the imaging sensors 24, 32 differ from that of the sensor 12 used for motion estimation, then the motion estimate $\Delta x_c(t)$ is rescaled to provide appropriate image velocity(ies) for these sensors. Rescaling involves multiplying the motion estimate $\Delta x_c(t)$ by a factor of a ratio of angular pixel resolutions. I.e. for sensor 24 or 32, the equivalent of $\Delta x_c(t)$, $\Delta x_c(t)_{24}$ or $\Delta x_c(t)_{32}$, is obtained by multiplying $\Delta x_c(t)$ by $APR_{24}/APR_{12}$ or $APR_{32}/APR_{12}$ respectively, where $APR_n$ (n=12, 24 or 32) represents the angular pixel resolution of sensor n in pixels per degree.

If a composite image is reconstructed from data collected at a sensor that has a higher frame rate than that used to provide the motion estimate $\Delta x_c(t)$, then successive motion estimates $\Delta x_c(t)$ are interpolated to provide estimate values appropriate for frames intermediate those associated with the motion estimates. A simple linear interpolation is applied at an imaging sensor frame number $(t+\alpha)$, $\alpha<1$, where the index t indicates the frame number at the motion estimation sensor:

$$x(t+\alpha)=x(t)+\alpha\Delta x_c(t) \tag{14}$$

$x(t+\alpha)$ is rounded to its nearest whole number to provide the frame position in the composite image array. Non-linear interpolation may also be used, for example incorporating acceleration into the model. However, unless the change in container velocities is significant between frames, this is unlikely to improve image quality to any great extent.

An alternative method of composite image generation is shown schematically in FIG. 7. In this drawing, the image processing unit 14 (not shown) includes an image data accumulator array 100 and a count accumulator array 102 in addition to a composite image array 104. The values of all pixels in both data and count accumulator arrays 100, 102 are initially set to 0. A divider 106 is connected to all three arrays 100, 102, 104. Data within an incoming image frame 108 is written to position x'(t) as before, but in this embodiment of the invention, pixel intensity values are added to values currently held in respective pixels in the image data accumulator array 100. All pixels in the count accumulator array 102 at positions corresponding to those to which data is added in the data accumulator array 100 are increased in value by 1. Once all frame data from a sensor currently being addressed has been assembled and written to the image data accumulator array 100, the divider 106 divides each pixel value in the data accumulator array 100 by a like-located or corresponding pixel value in the count accumulator array 102. The cumulative effect of this is that each pixel in the count accumulator array 102 contains an integer equal to the number of times data has been added to a respective like-located pixel in the data accumulator array 102. This integer is then used at 106 as the divisor of the value of the data accumulator array pixel, and the ratio so obtained is therefore an average over two or more frames. The resulting ratio is written to the composite image array 104.

This method of assembling the composite image provides integration of sensor data and therefore reduces image noise. Data is cumulatively summed in the image data accumulator array 100. If an object region is imaged to a pixel in more than one image frame, this method, allows all pixel information relating to that region to be used in generating the composite image. The count accumulator array 102 records how many times pixels in the composite image have information written to them. Pixels in the final composite image are therefore at intensities averaged over contributing sensor data pixels in each case, and the number of contributing pixels can differ between different composite image pixels. The degree of noise reduction provided by this enhanced method of image reconstruction depends on the speed at which the container 6 is moving. That is, for a slow-moving container, a pixel in the composite image may be generated using several sensor data image pixels.

FIG. 8 illustrates schematically a second alternative method of composite image generation, and elements equivalent to those shown in FIG. 7 are like-referenced. As shown in this drawing, the image processing unit 14 (not shown) again includes an image data accumulator array 100, count accumulator array 102, composite image array 104 and divider 106. The processing unit 14 also includes first and second multipliers 110 and 112. A central frame portion 114 (one or more image frame columns) of an image frame at sensor time t is input first to both multipliers 110 and 112. At the first multiplier 110, each pixel of the frame portion 114 is multiplied by a left weighting factor $w_l(t)$. At the second multiplier 112, each pixel of the frame portion 114 is multiplied by a right weighting factor $w_r(t)$. The weighting factors $w_l(t)$ $w_r(t)$ are calculated from the cumulative image position x(t) in accordance with the following equations:

$$x'(t)=\lfloor x(t) \rfloor \tag{15}$$

$$w_r(t)=x(t)-x'(t) \tag{16}$$

$$w_1(t)=1-w_r(t) \tag{17}$$

The first multiplier 110 outputs left-weighted sensor data which is added to the image data accumulator array 100, with pixel x(t) being assigned to accumulator pixel x'(t); i.e. the integral pixel position to which the actual calculated value x(t) is rounded down in Equation (15) by a floor operator $\lfloor\ \rfloor$. At the same time the corresponding pixels in the count accumulator array 102 have their values raised by the value of the left weighting factor $w_l(t)$. The second multiplier 110 outputs right-weighted sensor data which are added to the image data accumulator array 100 at positions of the kind x'(t)+1, i.e. the integral pixel position to which the actual calculated value x(t) is rounded up. Corresponding pixels in the count accumulator array 102 have their values raised by the value of the right weighting factor $w_r(t)$. This process continues with two sets of weighted intensity pixels being added to the image data accumulator array 100 and two sets of weights being aggregated in the count accumulator array 102 as each frame portion 114 is processed.

Once all frame data from the currently addressed sensor have been assembled and written to the image data accumulator array 100, the divider 106 divides the contents of the data accumulator array 100 by corresponding contents of the count accumulator array 102 as described earlier with reference to FIG. 7. The result of this division is written to the composite image array 104.

This method of composite image generation allows sensor data to be written to fractional pixel positions in the composite image, rather than rounding to the nearest integral position. Geometric fidelity of the composite image is thereby improved. The interpolation scheme described involves only linear interpolation in that frame data is written to only two columns in the composite image. Higher order interpolation methods are of course possible in which data from a single sensor column is written into multiple columns of the accumulators 100, 102, with appropriate weightings. Such methods are however computationally more expensive and unlikely to achieve more than a modest improvement in image quality. In most applications therefore, the additional complexity of a non-linear interpolation is unlikely to be justified.

It has thus far been assumed that sensor refresh rate and container speed are sufficiently high and low respectively to allow capture of an ensemble of image frames containing all information necessary to make a composite image of the complete container. Of course this may not necessarily be the case. If the container is fast-moving then image acquisition may be insufficiently fast to ensure that all areas of the container are imaged. In effect, the composite image is undersampled. If it is impracticable to reduce container motion or increase image acquisition rate and/or field of view of the sensor, then missing information can be interpolated by image processing.

FIG. 9 is a flow chart indicating the steps involved in a first method of filling gaps in the composite image generated using the processing arrays 100, 102, 104 of FIGS. 7 and 8. In FIG. 9, a filtering step 120 is first performed after all image frames have been processed, but prior to formation of the composite image by the divider 106. At this step 120 a spatial smoothing filter is applied to the contents of the image data accumulator array 100 and count accumulator array 102. This smoothes out the contents, reducing any gaps. The size of the smoothing filter used defines the maximum size of gap that can be bridged. Larger filters remove larger gaps but cause the image to be less detailed. Filtered data is written to separate arrays (not shown).

At step 122 the image processing unit sequentially addresses pixels of the composite image array 104. For each pixel, at step 124, the value of the corresponding pixel in the count accumulator array 102 is checked. If this count-accumulator value is significantly non-zero, the processor 14 proceeds to step 126 and the divider 106 divides the pixel value in the image accumulator array 100 by the like-located pixel value in the count accumulator array 102. At step 128, the result of this division is written to the appropriate pixel in the composite image array 104. In this way, if there is sufficient contribution to the intensity at that pixel (from one or more image frames), smoothing is unnecessary and data is extracted from the unfiltered arrays 100, 102.

Alternatively, if the count-accumulator pixel value is found not to be significantly non-zero at step 124, the processor then proceeds to step 130. At this step 130 the value at the like-located pixel in the filtered count accumulator array is checked. If this filtered value is significantly non-zero then the processor 14 proceeds to step 132 at which the divider 106 divides the pixel value in the filtered image accumulator array by the like-located pixel value in the filtered count accumulator array. The processor 14 then returns to step 128, and the result of this division is written to the appropriate pixel in the composite image array 104. If, on the other hand, the value in the filtered count accumulator array is also at or near zero, the processor 14, at step 134, applies a second filter, larger than the first, to the contents of the image data accumulator array 100 and of the count accumulator array 102. The checking and increasing filter size steps 130 and 134 are repeated until the accumulator arrays 100 and 102 have been sufficiently smoothed that the gap is bridged and the value at the relevant pixel in the count accumulator array 102 is significantly non-zero. At this point, division is performed using data in the most recently filtered arrays and the result written at 128 to the composite image array 104.

The image-filling process described in FIG. 9 therefore generates a maximally sharp image by generating the composite image directly if there are sufficient contributions to each pixel's value. Otherwise, the amount of smoothing is progressively increased until data has been sufficiently interpolated to generate an estimate of the respective pixel's value.

An alternative approach to image filling is set out in the flow chart of FIG. 10. This avoids the computational expense of filtering the entire array contents, which is done in the first approach regardless of the fact that many regions will have no gaps in their data. At step 140 in this embodiment, the image processing unit addresses sequentially the pixels in the composite image array 104. For each pixel, at step 142 an initial neighbourhood range is set to a single (the current) pixel. This range is expandable to include a plurality of pixels during subsequent iterations. At step 144, the corresponding pixel neighbourhood in the count accumulator array 102 is checked, and the values of all pixels within the neighbourhood are summed. At step 146 this summed value is checked as to whether or not it is significantly non-zero. If the summed value is significantly non-zero, the processor 14 proceeds to step 148 at which the values held in the corresponding pixel neighbourhood in the image data accumulator array 100 are summed. At step 150, the divider 106 divides the summed pixel value from the image accumulator array 100 by the like-located summed pixel value in the count accumulator array 102. At step 152, the result of this division is written to the appropriate pixel in the composite image array 104.

Alternatively, if the count pixel values summed within the neighbourhood give rise to a total which is found not to be significantly non-zero at step 146, the processor proceeds to step 154. At this step 154 the neighbourhood range is increased, and the processor again carries out the step 144 summation, this time investigating a larger neighbourhood. When the neighbourhood size is sufficient to give a significantly non-zero sum at step 146, values within the neighbourhood in both the image accumulator array 100 and count accumulator array 102 are summed at 148, divided at 150 and written at 152 to the appropriate pixel in the composite image array 104.

In this embodiment of the invention the composite image is formed by gap processing only in regions for which it is necessary. A region, of appropriate size, centred on the current pixel is used to compute the composite image pixel. A disadvantage of this approach is that the processing times for different containers may vary significantly, depending on the amount of filtering that is needed.

In most implementations it is to be expected that filtering need only be applied to the image in the direction of motion of the container (if indeed filtering is needed at all). For a few sensors however, for example a colour sensor with a Bayer filter, columns may not be densely sampled. Additional filtering in a direction orthogonal to the motion may therefore be required. This filter need not be of the same size as that applied in the direction of motion.

As an aid to summarising the image processing function, components of the image processing unit 14 are illustrated schematically in FIG. 11. The processing unit 14 comprises an image storage unit 162 for storing image information to be processed. The unit 162 comprises two image frame buffers (not shown), a current image buffer for storing a current image frame $I^t$ and a previous image buffer for storing the frame $I^{t-1}$ immediately preceding it. The storage unit 162 is linked to a gradient processor 164, which calculates (step 54 in FIG. 5) and stores the gradient of the current image frame at held in the image buffer 162. Data within the image buffer 162 is accessible by both a motion estimation processor 166 and an image analyser 168. The motion estimation processor 166 is additionally linked with the gradient processor 164, and the image analyser 168 can address and access a weights database 170 (which is optional).

The image analyser 168 uses data in the image buffers 162 and weights database 170 to distinguish between image pixels which correspond to scene background and those which correspond to an object being imaged (foreground). The motion estimation processor 166 processes image data within the image buffer 162 and gradient processor 164 in accordance with the measure of distinction provided by the image analyser 168. This generates an estimate of object motion between the current and immediately preceding image frames $I^t$ and $I^{t-1}$. After motion estimation is complete, the image frame in the current image buffer 162 and the current estimate of motion for that image frame are passed through a filter 172 to a display processor 174. Once all frames imaging the container 6 have been processed by the motion estimation processor 166, the display processor 174 constructs a composite image of the container in accordance with the derived motion estimates for each image frame. This process was described more fully earlier with reference to FIGS. 6 to 10. Frame outputs from one or more additional sensors 24 and 32 may also be input to the display processor 174, which then forms a respective composite image for each sensor in accordance with the motion estimate produced by the motion estimation processor 166 and rescaled if necessary as described earlier.

With reference to FIGS. 5 and 11 once more, at the start of the motion estimation process, data relating to a new image frame $I^t$ is input to the image storage unit 162. This data is stored in the current image buffer and that relating to the immediately preceding image frame $I^{t-1}$ is stored in the previous image buffer. Data may be physically transferred between these buffers, but in practice it is preferred to exchange their roles. That is, after a current image frame has been processed, the buffer in which it is held is redesignated as the previous image buffer and the other as the current image buffer. This may for example be achieved in software by swapping address pointers that point to the start of each frame, or in hardware by using a multiplexor to alternate between the two image frame buffers.

At step 54, the gradient processor 164 extracts information within the current image frame buffer and calculates the image gradient. For each pixel to be processed, the image analyser 168 first calculates pixel differences D1 and D2 using Equations (2) and (3). If this embodiment of the invention makes use of a look up table, then D1 and D2 are used to address the weights database 170, from which a relevant entry is returned to the image analyser 168. Alternatively, D1 and D2 are used by the image analyser 168 in order to calculate weights directly in accordance with a predetermined scheme to be used. In either case, a weight for each pixel on that cycle of the iteration is generated by the image analyser 168, and is a measure indicating the likelihood of the respective pixel being part of the foreground. This weight and calculations for D1 and D2 are passed to the motion estimation processor 166, which uses them to update the motion estimate and it also increments the iteration count, in accordance with steps 66 and 68 (see FIG. 5). The motion estimation processor 166 repeats the iteration until convergence or a maximum count is reached. Data for each image frame at is then passed to the filter 172, which smoothes the motion estimate and passes the result to the display processor 174 at which the composite image is constructed at step 74.

It can be seen from the methods described with reference to FIGS. 6 to 10, that reconstruction of a composite image from a series of image frames requires an estimate of object motion $\Delta x_c(t)$ relative to a sensor and between each pair of adjacent frames. In embodiments of the invention described above, a motion estimate $\Delta x_c(t)$ is obtained using information contained within image frames themselves. This process is computationally less expensive than any prior art techniques for estimating inter-frame motion without reference to external sensors.

In some applications of the invention however, it may not be necessary to rely wholly on image information to provide motion estimates: i.e. other sources of information may be available from which a motion estimate is obtainable. This has been mentioned previously in relation to assigning a value to the initial motion estimate. It is possible to make use of information from a separate speed sensor. In FIG. 12 there is shown a fourth embodiment of this invention indicated generally by 180, which is particularly suitable for scanning vehicles. In this drawing, a lorry 182 is shown being driven through a portal 184 on which are mounted first, second, third and fourth sensors 186, 188, 190 and 192. The first and second sensors 186 and 188 are millimeter wave imagers: the first millimeter wave imager 186 is positioned above the lorry 182 looking vertically downwards. The second millimeter wave imager 188 is positioned towards an upper corner of the portal 184 pointing diagonally across the vertical cross-section of the portal 184. It is directed downwards to cover the interior of the lorry. The first and second millimeter wave imagers 186 and 188 are mounted on respective scanner and mounting cradles to permit position and orientation adjustments.

The third sensor 190 is a sideways-looking visible band sensor located next to the fourth sensor 192, which itself is a thermal (infrared) imager. The visible band sensor 190 and thermal imager 192 are mounted on the portal 184 at approximately half a height anticipated for lorries to be imaged. This arrangement minimises geometric distortion. Lights 194 are mounted on the portal 184 to provide additional illumination of lorry sides to be viewed by the second, third and fourth sensors 188, 190 and 192 which are side-mounted. An infrared radiation shield 196 surrounds the thermal imager 192 in order to prevent (as far as possible) its being dazzled by reflection of strong infrared sources from the sides of the lorry. It is primarily intended to counteract reflection of sunlight, but it also reduces reflection of infrared radiation from other hot objects located behind it. Processing electronics are housed in a conveniently-located electronics bay 198.

The lorry 182 is driven through the portal 184 by its driver. The lorry's speed is driver controlled: i.e. it is not under the control of a scan operator and so cannot be considered constant. Indeed there may be a reason for a lorry driver to drive erratically in an attempt to compromise image data. If however images are collected and processed in accordance with the invention described herein, then four composite images of the lorry may be reconstructed and displayed for ready comparison at a rate suitable for a real-time implementation. Moreover, the lights 194 permit vehicle scans to be carried out both day and night, precluding attempts to avoid a scan by cover of darkness. The illumination they provide may be either in the visible waveband or in the near infrared (NIR, 0.7-1.0 μm). If the visible sensor 190 does not have a NIR cut-off filter, then NIR illumination (invisible to drivers), will be detectable by this sensor. Typical portal dimensions suitable for this embodiment are shown in the drawing.

FIG. 13 shows a version of the apparatus shown in FIG. 12 with modifications to incorporate a separate speed sensor 200, such as a radar or lidar sensor or beam-breakers. Parts equivalent to those described earlier are like referenced. The speed sensor 200 is arranged to measure the speed of an object periodically, synchronised with timing of image frame capture. That is, rather than perform an iterative calculation for each frame, an estimate of object motion is collected directly from the speed sensor 200 at the moment it is needed for frame placement in the composite image.

In this variant of the fourth embodiment of the invention the speed of an object was measured using a first computer based system (speed measuring system, not shown), and the speed was associated with an image frame captured and stored by a second computer based system (image capture system, not shown).

The speed measuring system used a speed sensor in the form of a Doppler radar 200 interfaced to a personal computer (PC) incorporating a counter timer card. The Doppler radar 200 was offset by 2.6 m laterally from a vertical line 202 through a position located centrally of an object to be scanned. This vertical line 202 meets a surface upon which the object moves at a point, and a horizontal line through that point extending in the object motion direction is referred to below as a "centreline" of the object. The Doppler radar 200 produced a radar beam for reflection from a moving object, the beam consisting of a signal in the form of a continuous wave output. The radar beam was directed horizontally towards the intersection of the vertical line 202 and the centre of the field of view of the visible band sensor 190. It was directed longitudinally away from the sensors 186 to 192 to provide an angle in the range 20 to 30 degrees between its beam centre and a line parallel to the centreline of the object. The Doppler radar 200 was positioned on a post 204 at a height such that its radar beamwidth covered an object when that object was being scanned by sensors 190 etc. This radar also produced an electrical square wave output pulse train, and the frequency of the square wave was directly proportional to the speed of a moving object reflecting the radar signal.

The frequency of the square wave was directly proportional to object speed, so multiplying the speed of the object by a numerical factor also multiplied the square wave frequency and divided its period by that factor in each case. Moreover, multiplying the speed of the object by a factor divided the time taken for the object to pass a point by that factor, which gives a direct relationship between distance travelled by the object and the period of the square wave. Consequently, the object travelled an equal distance between each successive pair of square wave rising edges irrespective of the square wave frequency. Beginning when the object began to pass a prearranged point, a respective elapsed time to each rising edge was measured. The speed measuring system was calibrated so that object distance moved between any pair of successive square wave rising edges was known, and this was approximately 5 mm. The cumulative distance moved by the object past the prearranged point was therefore obtainable for each time value.

The speed measuring system had a counter timer card which generated a timing signal (system clock) consisting of pulses at a clock frequency, and this system clock was distributed to the image capture system. A scanning laser 206 which was part of the speed measuring system was used to detect the presence of an object in the image capture system's field of view. The scanning laser 206 was located vertically above the Doppler radar 200 and provided for detection of objects within a region extending from it towards the intersection of the vertical line 202 and the surface over which the object moves to a distance of 6 m along this line. It was arranged for repetitive one-dimensional scanning of its laser beam over a scanned area consisting of a 180-degree arc. This scanned area was sub-divided into a rectangular zone extending 3 m along the object motion direction and height 6 m extending towards the surface over which the object moves. When the speed measuring system received a return laser beam (return signal) from within the rectangular zone, this indicated that an object was reflecting the laser beam and thus was present in the image capture system's field of view. The initiation of the return signal from within the rectangular zone was used to activate the image capture system and start a counter on the counter timer card which counted the system clock. Similarly, the image capture system was deactivated in response to the return signal ceasing to be received indicating absence of any object to be scanned.

In the speed measuring system the counter timer card counted the number of pulses of the system clock that occurred since initiation of the return signal, this initiation being referred to below as a start signal. These counts were stored by the speed measuring system in synchronism with the rising edge of each square wave output pulse from the Doppler radar. The stored counts represented time elapsed from the start signal to each square wave rising edge. Elapsed time from the start signal to each rising edge was proportional to object position displacement from the prearranged point, and so each count represented a respective time at which the object position had changed by a constant increment in distance. The times and positions were added periodically to a table of time/position data to update it.

The image capture system received the start signal and system clock from the speed measuring system. It also received the tables of time/position data periodically when updated. When the start of each image frame was captured the number of pulses of the clock frequency that had occurred since the start signal was counted and recorded. The count was made by a counter timer card in the image capture system, using a timing signal derived from the start of the image frame to latch the current count of the system clock. This associated a capture time with each image frame relative to a time origin as used by the speed measuring system: i.e. the time origin was the start signal provided by initiation of the laser return signal.

To build up an image appropriately from image frames, the image capture system compared a capture time recorded for a frame with associated time/position data sent by the speed measuring system. The image capture system found two adjacent time values, one before and one after the frame capture time recorded, read the associated position values and performed a linear interpolation between the two position values to determine the position of the moving object at the capture time for each image frame.

For systems with image spatial resolution lower than that of the speed measuring system it is simpler for the image capture system to choose a time closest to frame capture time and use a position value associated with that time as the frame position.

The composite image was then constructed within the image capture system by assigning each image frame to a respective image position determined for it as described above. The tables of time/position data were sent when the object was passing the sensor, so the image could be spatially corrected as the object was being imaged. Most of the time that the object was in the field of view of the image capture system could therefore be used for image storage as well as image capture; that in turn increased throughput of the combination of the speed measuring system and the image capture system. This is a non-contact method for imaging an object that is moving at a varying speed. It is particularly suited to imaging objects that have a numerically large aspect ratio (width to height).

In a speed measuring system (as previously described) that uses image processing to determine the positional displacement of each image frame, a timing signal derived from the start of the image frame can be used to latch the system clock count. This provides the capture time of each frame, which will be the same as the time the speed/position of the object was estimated. By an identical method to that described for a system using a separate speed sensor, a separate image capture system can use the time/position data produced to spatially correct its own image.

The output of a speed sensor may be a real-world velocity (for example, in miles per hour), in which case it is transformed to a corresponding speed (for example, in pixels per second) across an image plane, as required for image processing. This is a scalar transformation involving imaging geometry only. It may however be determined for the placement and characteristics of each sensor that scans the object, and the transformations it requires are readily incorporated into image processing computations.

Compared to embodiments described earlier, the disadvantage of using a speed sensor is the need to provide such a sensor, which increases the size of the system. The analysis needed to reconstruct the composite image is however computationally less demanding than for those embodiments in which motion is estimated from image information alone. Direct measurement of object speed allows the or each sensor to be operated at a higher frame rate, which in turn permits scanning of faster-moving objects. The limiting factors of this arrangement are the response time of the speed sensor itself and the need to ensure that the object does not move so fast that the apparatus is unable to reconstruct a complete composite image. Accordingly, the advantage of this embodiment is further brought out if it incorporates one of the gap-filling methods of interpolation described with reference to FIGS. 9 and 10, in which case the latter restriction may be relaxed somewhat.

It is envisaged that image processing requirements using speed sensor information could permit real time image reconstruction using standard personal computer (PC) hardware (probably a dual processor PC) at a frame rate of around 700 strips per second. If this equipment were used in vehicular scanning and sited at the edge of a road, then this frame rate would equate to a vehicle 3 m away travelling at 140 mph. Conversely, real time operation of apparatus employing motion estimation from image data also described herein, limits the frame rate such that scanning can be reliably performed on vehicles travelling at a maximum speed in the region of 30 mph.

The computations set out in the foregoing description can clearly be evaluated in an automated manner, i.e. by an appropriate computer program comprising program code instructions embodied in an appropriate carrier medium and running on a conventional computer system. The computer program may be embodied in a memory, a floppy or compact or optical disc or other hardware recordal medium, or an electrical or optical signal. Such a program is straightforward for a skilled programmer to implement on the basis of the foregoing description without requiring invention, because it involves well known computational procedures.

The invention claimed is:

1. An apparatus for scanning a moving object, the apparatus having a sensor oriented to collect a series of images of the object as it passes through a sensor field of view and image processing means arranged to input the series of images and to form a composite image therefrom, the image processing means including:

a) motion estimating means for generating an estimate of object image motion between images in the series of images, including image analysing means for deriving, for pixels within a current image from the series of images, likelihood measures indicating likelihoods of respective pixels corresponding to parts of the object; and b) display processing means for generating a composite image to which the series of images contributes at positions derived from estimated object image motion; wherein i) the series of images includes a predecessor image obtained prior to the current image, and the motion estimating means is arranged to generate an estimate of object image motion between the current image and the predecessor image from image pixels weighted in accordance with the likelihood measure, and ii) the likelihood measure is derived from intensity of the current image pixel, intensity of a second pixel located in the predecessor image equivalently to the current image pixel, and intensity of a third pixel which is in the predecessor image and is estimated to be imaging an object region which is the same as that imaged by the current image pixel, the third pixel having a location derived by compensation for object motion, and estimates of standard deviations of noise in the object image intensity and background image intensity $\sigma_b$ in accordance with equations as follows:

$$\text{likelihood measure} = w_f(x, y) = \frac{p_f(x, y, \Delta x_i)}{p_f(x, y, \Delta x_i) + p_b(x, y)},$$

where:

$$p_f(x, y, \Delta x_i) = \frac{1}{\sigma_b\sqrt{2\pi}}\exp\left(-\frac{(I_p^t(x, y) - I_p^{t-1}(x + \Delta x_i, y))^2}{2\sigma_f^2}\right),$$

and $$p_b(x, y) = \frac{1}{\sigma_b\sqrt{2\pi}}\exp\left(-\frac{(I_p^t(x, y) - I_p^{t-1}(x, y))^2}{2\sigma_b^2}\right).$$

2. The apparatus according to claim 1, wherein the moving object is a vehicle controlled by a driver, and wherein the image processing means include image analysing means for deriving, for each of a number of pixels within a current image in the series of images, a respective likelihood measure indicating likelihood of pixel corresponding to a part of the vehicle, the image analysing means being arranged to use information contained within the current image and a predecessor thereof.

3. An apparatus for scanning a moving object, the apparatus having a sensor oriented to collect a series of images of the object as it passes through a sensor field of view and image processing means arranged to input the series of images and to form a composite image therefrom, the image processing means including:

a) motion estimating means for generating an estimate of object image motion between images in the series of images, including image analysing means for deriving, for pixels within a current image from the series of images, likelihood measures indicating likelihoods of respective pixels corresponding to parts of the object; and b) display processing means for generating a composite image to which the series of images contributes at positions derived from estimated object image motion; wherein i) the series of images includes a predecessor image obtained prior to the current image, and the motion estimating means is arranged to generate an estimate of object image motion between the current image and the predecessor image from image pixels weighted in accordance with the likelihood measure, and ii) the likelihood measure is derived from intensity of the current image pixel, intensity of a second pixel equivalently located in its predecessor and intensity of a third pixel which is in the predecessor image and which is estimated to be imaging an object region which is the same as that imaged by the current image pixel, the third pixel having a location derived by compensation for object motion, and the likelihood measure being given by:

$$w_f(x, y) = \frac{(I_p^t(x, y) - I_p^{t-1}(x, y))^n}{(I_p^t(x, y) - I_p^{t-1}(x, y))^n + (I_p^t(x, y) - I_p^{t-1}(x + \Delta x_i, y))^n + c}$$

where $w_f(x,y)$ is the likelihood measure, $I_p^t(x,y)$, $I_p^{t-1}(x,y)$ and $I_p^{t-1}(x+\Delta x_i,y)$ are the intensities of the first, second and third pixels respectively, n is a positive number and c is a non-negative constant.

4. The apparatus according to claim 3, wherein the image analysing means is arranged to use a first estimate of object motion to calculate a second such estimate, and thereafter to calculate iteratively the likelihood measure based on an estimate of object motion generated by the motion estimating means in a previous iteration, and the motion estimating means is arranged to generate iteratively an estimate of object motion for a current iteration based on likelihood measures updated using respective previous motion estimates.

5. The apparatus according to claim 3, wherein the sensor is a framing sensor with a substantially rectangular field of view and the display processing means is arranged, for each of the series of images, to take image data from a plurality of strips within the sensor field of view and to generate a corresponding plurality of composite images, each composite image having a contribution from a respective strip in each image.

6. The apparatus according to claim 3, wherein the sensor is a first sensor and the apparatus includes at least one other sensor oriented to obtain a respective series of images of the object as the object passes through the at least one other sensor's field of view, the at least one additional sensor is at least one of a visible band imager, a millimeter wave imager and a thermal imager and the display processing means is further arranged to generate a respective composite image from each series of images in accordance with the estimate of image motion derived from the first sensory s series of images.

7. The apparatus according to claim 3, wherein the motion estimating means is an object speed sensor.

8. The apparatus according to claim 7, wherein the object speed sensor is a Doppler radar providing an output signal with frequency proportional to object speed.

9. The apparatus according to claim 8, arranged to provide a common clock signal to time the Doppler radar output signal and collection of images in the series of images in terms of counts of clock signal pulses and to provide respective frame signals to time images and time/position data derived from the Doppler radar output signal to time object movement, to perform an interpolation to relate image timing to object position and form the composite image from images located in accordance with object position.

10. A method of constructing a composite image from a series of images taken at a sensor as an object moves through a field of view of the sensor, the method comprising the steps of:

a) inputting a current image for processing;

b) deriving an estimate of object image motion and associating a respective estimate of object image motion with each image when designated as a current image;

c) associating the current image with a respective position in a data accumulator derived from summation of estimates of object image motion for the current image and like estimates obtained for earlier captured images in the series;

d) designating successive images in the series of images as the current image and iterating steps a) to c) for each current image so designated; and e) constructing a composite image to which the series of image frames contributes from image central portions located according to respective positions in said data accumulator;

wherein step c) also includes the step of incrementing a count accumulator at pixel positions corresponding to those to which data is added to the data accumulator as appropriate to indicate the number of such additions for each pixel, and step e) comprises the step of dividing data accumulator pixel values with respective correspondingly positioned count accumulator pixel values.

11. The method according to claim 10, wherein each image central portion is at least as wide as an associated estimate of object image motion.

12. The method according to claim 10 including weighting both the count accumulator increment and pixel values in a central portion of the current image by left and right weighting factors to provide weighted increments and weighted pixel values respectively, the weighted increments are added to first and second integral pixel positions in the count accumulator and the weighted pixel values added to like-located pixel positions in the data accumulator, the integral pixel positions being those adjacent an estimatedly true pixel position derived from summation of object image motion for the current image and predecessors, and the left and right weighting factors being determined having regard to differences between the true pixel position and its adjacent integral pixel positions.

13. The method according to claim 10 including weighting both the count accumulator increment and pixel values in a central portion of the current image by weighting factors to provide products which are added to corresponding integral pixel positions within respective accumulators, the integral pixel positions being those adjacent an estimatedly true pixel position derived from summation of object image motion for the current image and earlier captured images and the series of weighting factors being determined in accordance with a smooth interpolation function.

14. The method according to claim 10, wherein step e) comprises the further steps of:

i) applying a spatial smoothing filter to data in the data accumulator and count accumulator; and ii) forming the composite image either by dividing data accumulator pixels value by respective correspondingly positioned count accumulator pixel values or by dividing a filtered data accumulator pixel values by respective correspondingly positioned filtered count accumulator pixel values, depending on whether or not respective count accumulator pixel values are non-zero in each case.

15. The method according to claim 10, wherein step e) comprises the further steps of:

1) setting an initial neighbourhood range of one pixel for each pixel in the count accumulator;

2) implementing a count accumulator summation of pixel values within its respective neighbourhood range for each pixel in the count accumulator;

3) implementing a check regarding whether or not the count accumulator summation is significantly non-zero;

4) if the check has an outcome which is untrue, indicating that the count accumulator summation is not significantly non-zero, iterating steps 2) and 3) with increase in neighbourhood range until the check is true;

5) for a data accumulator pixel equivalently located to the count accumulator pixel referred to in step 2), implementing a data accumulator summation over pixel values within a neighbourhood range equal to that for which the check indicated a significantly non-zero summation;

6) obtaining a division result by dividing the data accumulator summation by the significantly non-zero count accumulator summation; and 7) adding the division result to a pixel in a composite image located correspondingly to the count accumulator pixel referred to in step 2).

16. The method of claim 10, wherein a computer-readable medium embodying program code instructions for execution by computer processing apparatus is used to perform steps b) e) wherein the instructions further relate to processing image data obtained using a sensor having a field of view through which an object moves.

17. The method according to claim 16, wherein the sensor is a first sensor and the method incorporates use of a plurality of sensors of which the first sensor is one, and the sensors include a second sensor obtaining data to generate the estimate of object image motion, and the method includes rescaling or interpolating this estimate before associating it with a respective image.

18. The method according to claim 16 including the step of measuring object speed using a speed sensor and deriving from this measurement a respective estimate of object image motion associated with each of the series of images.

19. The method according to claim 16, wherein the sensor is a framing sensor with a substantially rectangular field of view and step b) includes the additional step of writing at least one co-located non-central portion of data contained within each of the series of images to respective further image data accumulating means and step c) includes forming a plurality of composite images from data contained in respective image data accumulator arrays.

* * * * *